United States Patent [19]

Okubo et al.

[11] Patent Number: 5,731,994
[45] Date of Patent: Mar. 24, 1998

[54] METHOD OF PACKING PARTICLES INTO VESSELS AND APPARATUS THEREFOR

[75] Inventors: Shuichi Okubo; Kazunari Naya, both of Toda, Japan

[73] Assignee: Japan Energy Corporation, Tokyo, Japan

[21] Appl. No.: 602,173

[22] Filed: Feb. 15, 1996

[30] Foreign Application Priority Data

| Feb. 16, 1995 | [JP] | Japan | 7-050353 |
| Jun. 8, 1995 | [JP] | Japan | 7-164549 |
| Jun. 8, 1995 | [JP] | Japan | 7-164550 |

[51] Int. Cl.$^6$ ..................................... B65B 1/04
[52] U.S. Cl. .................. 364/555; 422/219; 422/301; 422/232; 141/1; 141/836; 141/865.5
[58] Field of Search ............... 364/555; 422/219, 422/301, 232; 141/1, 286, 392; 73/865.5

[56] References Cited

U.S. PATENT DOCUMENTS

| 3,804,273 | 4/1974 | Uhl | 214/17 CB |
| 4,433,707 | 2/1984 | Farnham | 141/1 |
| 4,736,311 | 4/1988 | Takeuchi et al. | 364/555 |
| 4,794,450 | 12/1988 | Saito et al. | 358/93 |
| 4,972,884 | 11/1990 | Souers et al. | 141/1 |
| 5,096,835 | 3/1992 | Yokomori et al. | 436/165 |
| 5,102,223 | 4/1992 | Uesugi et al. | 356/376 |
| 5,230,026 | 7/1993 | Ohta et al. | 382/6 |
| 5,426,501 | 6/1995 | Hokanson et al. | 356/335 |

*Primary Examiner*—Emanuel T. Voeltz
*Assistant Examiner*—Hien Vo
*Attorney, Agent, or Firm*—Panitch Schwarze Jacobs & Nadel, P.C.

[57] ABSTRACT

A particle packing apparatus which includes a particle distributor capable of forming a concave-conical packed surface upon scattering of particles in a steady state and having a parameter with which to control the size of the cone and a packing monitor capable of continuously detecting the entire packed surface condition is provided. A concave-conical packed surface of the particles scattered in a steady state is formed by the distributor while the packing monitor is continuously detecting the formation of the packed surface and intermittently or continuously the parameter of the particle distributor is controlled to reduce the cone size gradually and form and deposit, on the inner side of the concave-conical packed surface, successively smaller packed surfaces at predetermined intervals or uninterruptedly, whereby a flat, smooth packed surface is formed. When scanning the deposit surface with laser light, detecting the reflected light, and measuring the deposit height by trigonometry, it is image-processed. A suitable particle distributor has an outside cover, a hopper supported inside the cover and open at the lower end, a motor mounted on the hopper and coupled to a rotating shaft extending downwardly through the center of the hopper and beyond its lower opening, and a uniaxial spheroidal rotating disc fixed to the lower end of the motor rotating shaft so as to receive the particles falling from the hopper. The rotating disc has shaped slits formed to discharge particles.

16 Claims, 21 Drawing Sheets

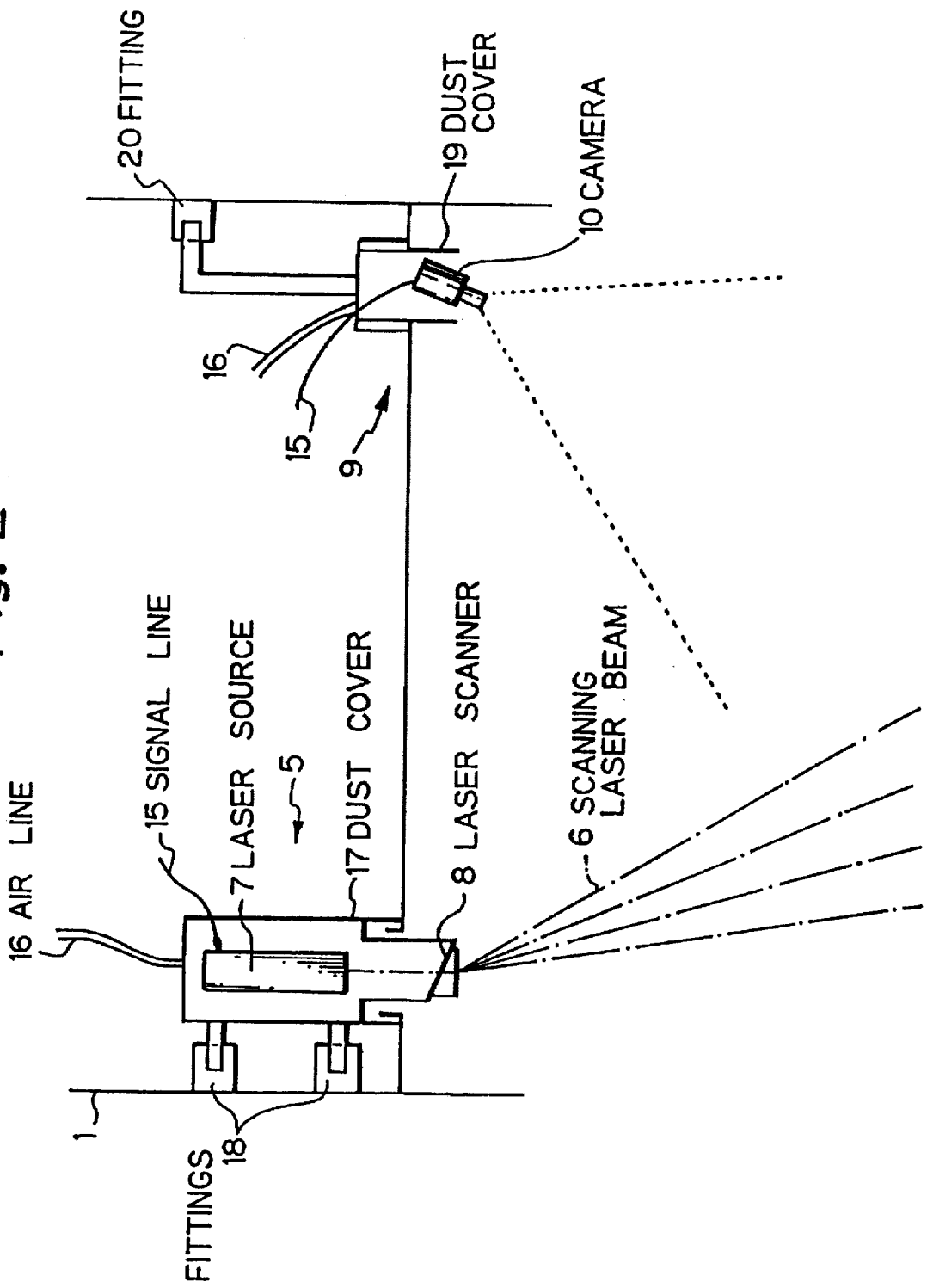

INTEGRATING SEVERAL FRAMES

PROCESSING PROCEDURE FOR CATALYST PACKING MONITOR

HORIZONTAL PARTICLE CONVEYANCE

VERTICAL PARTICLE CONVEYANCE

PARTICLE SUPPLY AREA AND CONVEYANCE

PARTICLE SCATTER RANGE

ROTATING DISC

SCATTERED SURFACE

NECESSARY SLIT OPENING ANGLE

DENSI CAT METHOD

UOP METHOD

COP METHOD

METHOD OF PACKING PARTICLES INTO VESSELS AND APPARATUS THEREFOR

FIELD OF THE INVENTION

This invention relates to a method of packing particles, such as of catalysts, grains, or feedstuff, into reaction vessels, silos, or the like by means of a packing apparatus comprising a particle distributor (loading machine) and a packing monitor so as to obtain a flat, smooth packed surface and also relates to a distribution and packing apparatus to be used for the method. More particularly, this invention concerns a method of packing a catalyst into any of various reaction vessels typified by oil refining equipment, to obtain a smooth packed surface while monitoring in real time the unevenness of the catalyst deposit surface and also concerns a catalyst distribution and packing system capable of realizing a flat catalyst packed surface, easy and simple control, convenient handling and installation, and high speed catalyst conveyance without damaging or breaking the catalyst particles.

BACKGROUND OF THE INVENTION

Catalysts are utilized, for example, in the synthesis or decomposition of various materials. For instance, catalysts are often used in the oil industry, in refining heavy cycle oil to high-octane gasoline or in simultaneous desulfurization and cracking in the presence of a large quantity of hydrogen. The catalysts for use in catalytic cracking are, e.g., solid acid silica, alumina, and zeolite catalysts. Usually used are activated metals supported on alumina, alumina-silica, zeolite, silica or other carriers, in the form of columns 0.5 to 3.0 mm in diameter and 3.35 to 10 mm long or of such a cross sectional contour consisting of three or four over-lapping circles. These catalysts are packed in reaction vessels (packed towers). Since the packed catalyst condition governs the efficiency of operation, it is customary to mount a catalyst distributor in the upper, central space of the reaction vessel and scatter the falling catalyst particles in the space accomplish uniform packing.

However, even scatter packing fails to produce a flat packed surface; the packed particle surface usually undulates. If the undulation exceeds a predetermined level, the operation efficiency drops. To avoid this, the unevenness must be corrected somehow or other, for example by controlling a scatter parameter of the packing apparatus. It is important especially with a catalyst to idealize the space presence density and control the packing velocity within the range of dense loading on the packed surface (high density packing of catalyst particles with the axial directions of the particles aligned in the horizontal plane). The unevenness of the packed surface of scattered particles is not easy to determine because of the depth of reaction vessels; it has usually been determined by manual measurement of suitably chosen measuring points with a measuring tape unwound from the level of the packing apparatus. The measurement is made, e.g., at intervals of once in 30 minutes at 12 measuring points. This is time-consuming and just a rule of thumb. In extreme cases the accuracy of measurement is as poor as ±50 mm and the packed surface distribution is as large as 400 mm. The efficiency of packing operation is low because the operation is interrupted whenever the measurement is made.

In order that the packed surface of particles scattered in a vessel may be made even and uniform, the development of a technique of more properly monitoring and measuring the packed surface condition in real time has been looked for. In packing catalyst particles, e.g., there has been demand for a measurement accuracy of ±20 mm of the packed surface condition.

With the view of meeting these requirements, we previously developed a system for measuring the deposit height of particles in a vessel by trigonometry. According to this system, while the packed particle surface is being scanned with laser light having a beam diameter larger than the cross sectional area of the particles and selected to suit a target accuracy, the reflected light from scanned points is detected at predetermined intervals. This system is a packing monitoring method for use when a vessel is packed with particles, characterized by scanning the packed surface with laser light, detecting the reflected light, and measure the deposit height by trigonometry from the position of specific scanned points, laser light emitting position, and laser light detecting position. The method uses a packing monitor system comprising a laser light generating and scanning unit which generates a laser light having a beam diameter larger than the cross sectional area of the particles and chosen depending on the target accuracy to scan the packed particle surface with the laser light, and an imaging unit for detecting the reflected laser light from the scanned points, both of the units being mounted inside the vessel to be packed with the particles and at levels above the packed height, a computer for computing the depths of scanned points by trigonometry from the positions of specific scanning points, the position of the laser light generating and scanning unit, and the position of the imaging unit, and a displaying the data including the packed surface depth distribution.

Thus, in packing particles in a vessel, it has become possible to display in real time the packed surface information including the packed height distribution and the trend of any optional cross section across the center of the packed surface, by scanning the packed particle surface with a laser light, detecting the reflected light, and measuring by trigonometry the deposit depths at the scanned points at desired measuring intervals and at desired measuring points.

The particle packing monitoring method that utilizes laser beam scanning has made it possible to monitor and measure the deposited surface condition in real time and more properly than heretofore. In actual observation, however, the method leaves room for improvement in processing abundant data within a short time while maintaining good accuracy and in distinguishing between deposited particles and the particles being scattered.

Meanwhile, a wide variety of particle distributors have heretofore been used. One example is a type which has side slits equipped with adjustable gates and lower slits at the bottom and includes a rotating disc attached to the bottom, so that the distribution state can be controlled by adjusting the openings of the side and lower slits and the number of revolution of the rotating disc.

Other examples of existing particle (catalyst) distributors include "Densi Cat", "UOP", and "COP" types shown, respectively, in FIGS. 24, 25, and 26. All of them are equipped with a hopper and blades for catalyst scattering. The "Densi Cat" type uses a plurality of rubber blades to perform all-directional uniform distribution based on the reflection with the openings of the blades and the scattering by blades. The "UOP" type takes advantage of the centrifugal force produced by 2 to 4 straight blades. The "COP" type uses 1 to 3 layer blades of elliptical plates provided with guides to cause distribution of scatter distances.

Japanese Patent Application Publication No. 22807/1989 discloses a method of packing catalyst particles gradually in a reaction vessel by a catalyst discharger liftably hung inside the vessel and moved upward so as to maintain the distance between the discharger and the packed particle surface within a preset range. The catalyst packing apparatus described for use in the method comprised a platform suspended inside the vessel and a catalyst discharger mounted on the platform, the discharger comprising a motor and a saucer rotatably driven by the motor, the saucer having vertical weirs formed at predetermined intervals and slits formed between the weirs.

The afore-mentioned systems still have problems yet to be solved as follows:

(1) Inability to produce a desirable packed surface.

(2) Neither technique for improving controllability of process by increasing the number of parameters or optimization through theoretical analysis has yet been perfected.

(3) Complexity of construction and time-consuming installation.

In connection with the conveyance of particles there is demand in this art for a new particle scattering method which permits uniformity of space presence density and high density packing (dense loading) of particles in addition to flatness of packed surface (evenness of scatter height), easy and simple controllability, convenient handling and installation, and high speed particle conveyance without damage or breakage of particles. To be more specific, the requirements are:

(a) Easy handling and installation; shortest possible setting time (within 1 hr.)(it takes as much as 1 to 2 hours for the equipment of the Densi Cat, UOP, and COP systems.);

(b) No damage to particles in packing them;

(c) Evenness of packed particle surface; dense loading and uniformity;

(d) Packing speed; fast particle conveyance (1 ton/5 min)

OBJECT OF THE INVENTION

It is an object of the present invention in connection with the conveyance of particles to establish a new particle packing technique which permits uniformity of space presence density and high density packing (dense loading) of particles in addition to flatness of packed surface (evenness of scatter height), easy and simple controllability, convenient handling and installation, and high speed particle conveyance without damage or breakage of particles.

As noted above, the particle packing monitoring method that utilizes laser beam scanning has made it possible to monitor and measure the deposited surface condition in real time and more accurately than heretofore. In actual observation, however, the method leaves room for improvement in processing plentiful data within a short time while maintaining good accuracy and in distinguishing between deposited particles and the particles being scattered. It is another object of the present invention to establish a procedure for handling the data by image processing.

SUMMARY OF THE INVENTION

It has now been confirmed that a packed particle surface can be simply smoothed in a particle packing apparatus which comprises a packing monitor and a particle distributor (loading machine) capable of forming a concave-conical packed surface when scattering the particles in a steady state and having a parameter with which to control the size of the zone, by gradually decreasing the size of the resulting cone.

On the basis of this finding, this invention provides a method of smoothing the particle packed surface with a particle packing apparatus which includes a particle distributor (loading machine) capable of forming a concave-conical packed surface upon scattering of particles in a steady state and having a parameter with which to control the size of the cone and a packing monitor capable of continuously grasping the entire packed surface condition, characterized by forming a concave-conical packed surface of the particles scattered in a steady state by the distributor while the packing monitor is continuously grasping the formation of the packed surface, and intermittently or continuously controlling the parameter of the particle distributor to reduce the cone size gradually and form and deposit, on the inner side of the concave-conical packed surface, successively smaller packed surfaces at predetermined intervals or uninterruptedly, whereby a flat, smooth packed surface is formed.

The operation of smoothening the packed particle surface may be repeatedly made.

This invention also provides a method of flattening the particle packed surface characterized in that when a concave-conical packed surface formed by scattering the particles in a steady state for a given time period has a height at the center ($h(ct)$) and the height at the edge or periphery ($h(edge)$), the profile of the concave-conical packed surface to be formed by scattering the particles by controlling the parameters of a particle packing apparatus is made as $2 \geq h(edge)/h(ct) \geq 1$.

This invention further provides a method of flattening the particle packed surface characterized by using a particle packing apparatus by which the profile of a concave-conical packed surface formed by scattering the particles in a given state for a given time period has a height at the center ($h(ct)$) and the height at the edge or periphery ($h(edge)$), the profile is made as $2 \geq h(edge)/h(ct) \geq 1$. A useful example of particles is catalyst particles.

The distributor (loading machine) to be used may be of any type that can produce a concave-conical packed surface upon distribution in a steady condition, with a parameter whereby the size of the cone is controlled. Particularly desirable is a distributor that can form a concave-conical packed surface when particles are scattered inside a vessel under condition such that the maximum scatter distance reaches the inner wall of the vessel, the distributor having a parameter with which to control the size of the cone. A suitable example of such a distributor are the type having side slits equipped with adjustable, for example pneumatically, gates, one for each, and a low slit at the bottom, and a rotating disc attached to the bottom, the openings of the side and lower slits and the number of revolution of the rotating disc being adjustable to control the scatter condition.

Another suitable example is the type comprising an outside cover, a hopper located inside and supported by the cover, with the lower end open, a motor mounted on the hopper and couple to a rotating shaft extending downwardly through the center of the hopper and beyond the lower opening thereof, and a uniaxial spheroidal rotating disc fixed to the lower end of the motor rotating shaft so as to receive the particles falling from the hopper, said rotating disc having slits formed to discharge particles therefrom, each said slit being so shaped that the path of particles therethrough is a locus represented by the sum of a locus of a particle that has fallen from the hopper onto the center of the uniaxial spheroidal disc moves until its movement reaches the speed of the disc under the action of the rotational force and the function of the locus in which the angle of retardation in the rotating direction with respect to the distance of radial movement from the center of the disc agrees with the required quantity of particles to be scattered in the radial position.

In order to improve the particle distribution performance, various modifications may be made, including (a) mounting a baffle plate on the rotating shaft, adjacent to the bottom of the disc, (b) covering and sealing at least the portion of the rotating shaft that extends inside the hopper with a sleeve to prevent the breakage of particles, (c) supporting the hopper tiltably or movably from the outside so that the uniaxial spheroidal disc can be inclined or moved as desired, (d) provision of a fixing leg or legs to the outside cover, and (e) connecting a suspension link to the top of the outside cover. Slit shapes can be given by some approximate expressions.

With a particle distributor of extremely simplified construction, uniform particle distribution is ensured by slits of curved shapes so formed as to match the motion of particles on the disc. A seal on the rotating shaft protects particles against breakage. The provision of a baffle plate is effective too in preventing particle breakage. A tiltable or movable rotating disc surface permits control of particle scattering for uniform distribution. The adoption of a suspension mechanism provides convenience for mounting of the distributor for limited-time service. The use of a fixing leg or legs further facilitates mounting for short duration.

The slitted disc of the saucer type used in the above-mentioned Patent Application Publication No. 22807/1989 is very shallow and small in diameter. It receives catalyst particles falling down from a chute, release the particles by centrifugal force sideways toward the periphery of the saucer while, at the same time dropping the particles evenly through slits. However, the slits are merely formed straightly in the radial direction, and weirs formed therebetween rather hamper free flow of the catalyst particles. The distributor of this reference is fundamentally different in concept from that of this invention that discharges particles through curved slits formed in the bottom of a uniaxial spheroidal disc so as to match the motion of the particles on the disc.

The packing monitor may be of any type capable of continuously watching and observing the entire packed surface, such as a television type monitoring device. Preferred for the purposes of the invention is a type comprising a laser-scanner for producing a laser beam having a beam diameter greater than the cross sectional area of the particles and chosen depending on the target accuracy to scan the deposited particle surface, an imaging device for detecting laser reflection light from scanned points, said laser-scanner and imaging device being both attached to the inner wall of the vessel at levels above the packed height therein, a computer for calculating the depth of packed surface at specific scanned points by trigonometry from the locations of the scanning points at the time of measurement, the position of the laser-scanner, and the position of the imaging device, and a display device that displays the data including the packed surface distribution.

When scanning a particle deposit surface with a laser light, the deposit surface is divided into m×n matrices, and the points on the matrices are sequentially irradiated with the laser. The scanning must be performed within short times for 10×10=100 points. When taking laser images with a camera, it is possible to usually take only at most several frames when the time required for image processing is taken into account. A problem arises here; the falling particles pass across the path of laser light being directed to points on matrices of the deposit surface, making the laser spot on the deposit surface scarcely discernible. In each frame usually a large number of particles falling across the laser light path glitter. Integration of images in several frames changes the luminant spots of scattering particles into a continuous line. Here the selection in advance of an image closest to one of the laser spot images registered renders it possible to distinguish between the laser spot incident on the deposit surface and the luminant spots with the scattering particles in the light path. Then the center of gravity of the preselected image is found and is used as a coordinate of the laser spot. To shorten the time required for image processing, only a certain area around the point which is expected to meet the laser spot is subjected to image processing. It is only necessary to perform image processing of a range from that point of at least one half of the maximum value of unevenness (in the depth direction) of the deposit surface, i.e., a square-shaped range in which each side is equivalent to at least the maximum value of unevenness (in the depth direction) of the deposit surface.

Thus the invention provides a method of monitoring particle packing which comprises, in packing particles in a vessel, scanning the deposit surface with laser light, detecting the reflected light, and measuring the deposit height by trigonometry from locations of specific scanned points, laser light emitting position, and laser light detecting points, characterized by the steps of dividing the deposit surface into matrices of m×n, sequentially irradiating the points on the matrices with laser, and performing image processing whereby several frames of images taken at each point are integrated to choose an image closest to a laser spot registered beforehand, and the center of gravity of each said image is found and made a laser spot, said image processing being made only within a range of at least one half of the maximum value of unevenness (in the depth direction) of the deposit surface from the points expected to meet the laser spot.

In the manner described the scanning range of a deposit surface is divided into m×n matrices, and points on the matrices are sequentially irradiated with laser light to scan the deposited particle surface. Several frames of laser image are taken by a camera from each point. The images of several frames each are integrated, and an image closest to a preregistered laser spot image is selected. The center of gravity of the image is found and used as a laser spot. Recognition of deposited particles with good accuracy is done by image processing. To shorten the time required for the image processing, only a certain range from the point that is expected to meet the laser spot is image processed. High accuracy recognition of deposited particles is made possible by image processing of a range of at least one half of the maximum value of deposited surface unevenness (in the depth direction), or a square range each side of which is more than the maximum value of the deposited surface unevenness (in the depth direction).

BRIEF DESCRIPTION OF THE DRAWINGS

FIG. 2 illustrates the manner in which a laser generator-scanner and an imaging device are fixed to the inner wall of a vessel;

DETAILED DESCRIPTION OF THE INVENTION

Figure 1A:
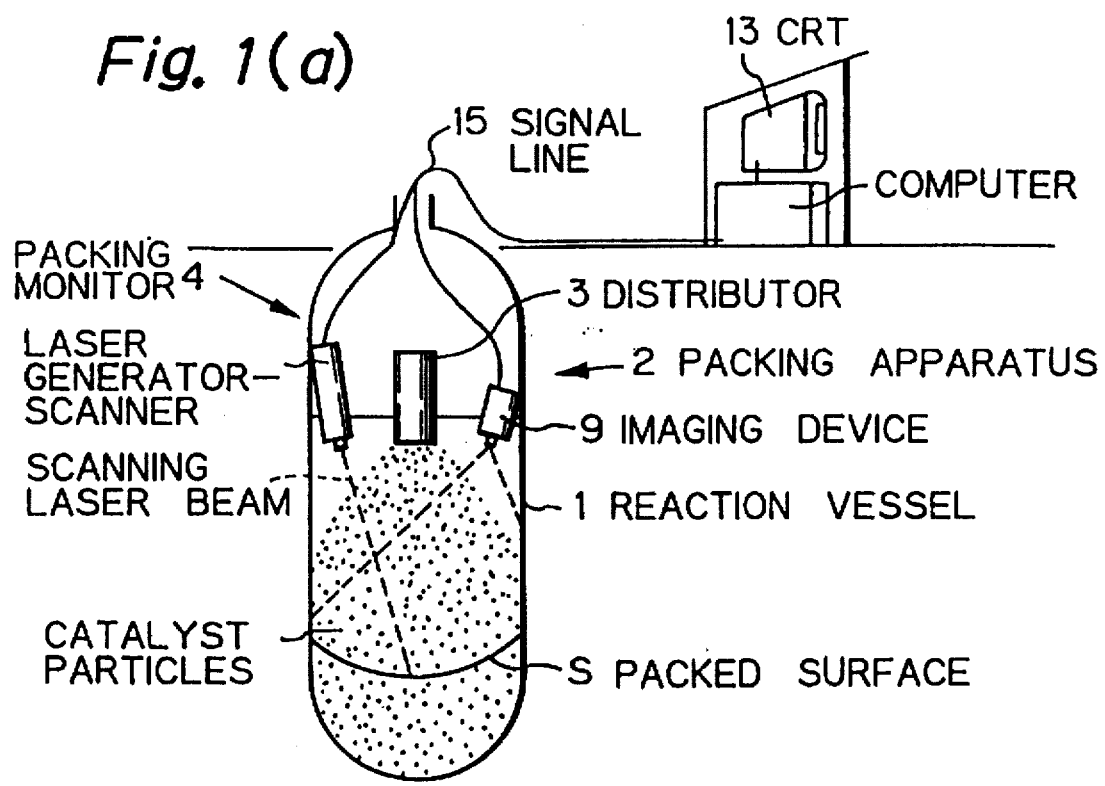
FIG. 1(a) is a front elevational view, partly in section, of a particle packing apparatus to be used in the present invention.

The present invention will now be described as embodied in distributing and packing catalyst particles into a reaction vessel. FIG. 1(a) shows a packing apparatus 2 comprising a distributor (loading machine) 3 held in the upper center of the reactor 1 to scatter and pack catalyst particles C into the space and a packing monitor 4 for continuously monitoring the condition of the packed surface S of catalyst particles being deposited. The distributor 3 to be used may be of any type that can produce a concave-conical packed surface upon distribution in a steady condition, with a parameter (e.g., number of revolution) whereby the size of the cone is controlled. Particularly desirable is a distributor that can form a concave-conical packed surface and has a parameter to control the size of the cone where the catalyst particles are scattered inside the reaction vessel 1 under condition such that the maximum scatter distance reaches the inner wall of the vessel. The packing monitor 4 may be of any type that can continuously watch and observe the entire packed surface S.

Figure 5A:
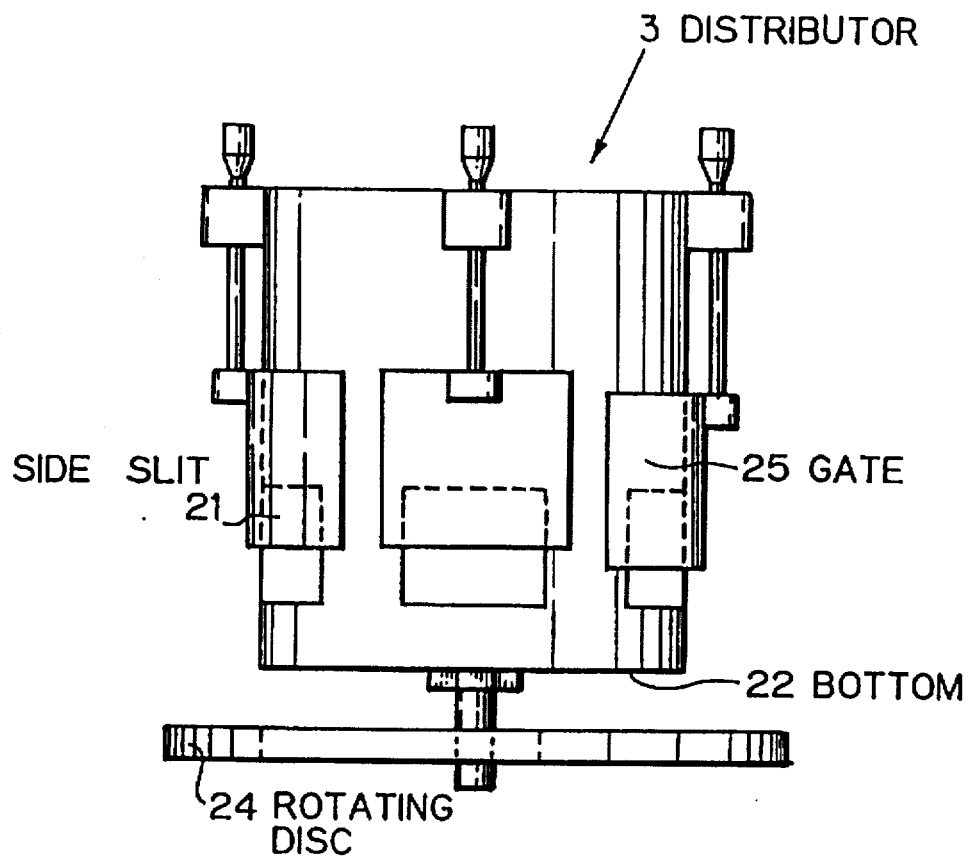
FIG. 5(a) is a side view of a typical distributor.
Figure 5B:
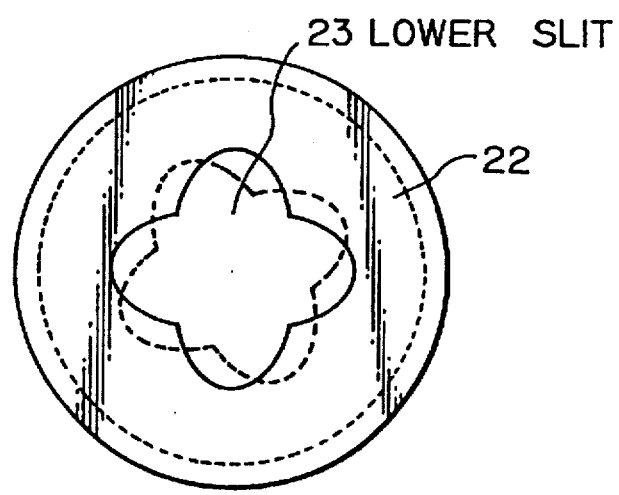
FIG. 5(b) shows a slit formed at the bottom of the distributor.

FIG. 5 shows a typical distributor 3. FIG. 5 (a) is a side view, and FIG. 5 (b) shows a bottom slit. The distributor has four side slits 21 formed in the side wall and one lower slit 23 at the bottom as shown at (b). A rotating disc 24 is suspended from the bottom. Each side slit is equipped with a adjustable gate 25. The lower slit also is adjustable. The distribution process can be controlled by adjusting the openings of the side and lower slits and the number of revolution of the rotating disc in response to the latest information on the packed surface.

Figure 1B:
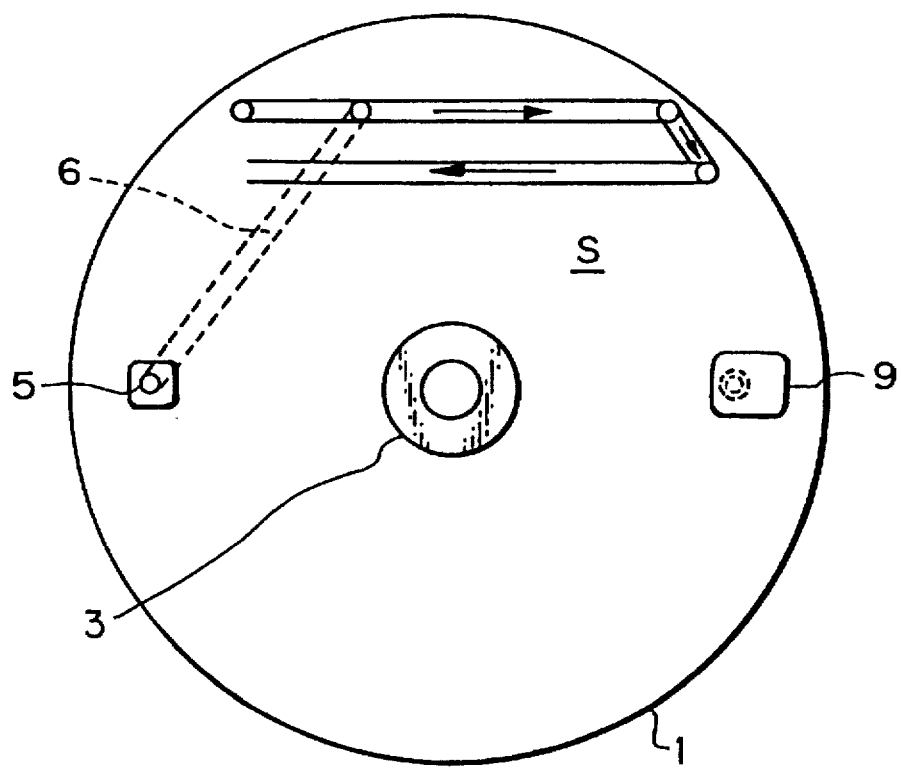
FIG. 1(b) is a schematic view illustrating how a packed surface is scanned with a scanning laser beam.

Turning to FIG. 1, the packing monitor 4, which may, for example, be a television monitor, is illustrated as a laser scanning type comprising a laser-scanner 5 and an imaging device 9, both of which are attached to the inner wall of the reaction vessel at substantially the same height as the distributor 3. The laser-scanner 5 produces a scanning laser beam 6. The imaging device 9 detects laser reflection light within a predetermined field of vision. A computer 11 calculates the depth of packed surface at specific scanned points by trigonometry from the location of the scanned points at the time of measurement, the position of the laser generator-scanner, and the position of the imaging device. The computer 11 and a CRT 13 that displays the data including the packed surface distribution are installed in a monitor chamber at a suitable location outside the reaction vessel. They are connected to the laser-scanner and imaging device with signal lines 15. FIG. 1(b) is a transverse sectional view of the packed surface S as seen from the level of the distributor 3, laser generator-scanner 5, and imaging device 9. It shows how the packed surface S is scanned with the scanning laser beam 6. The packed surface is monitored by the detection of reflected light from scanning points at regular intervals while the scanning laser beam 6 is scanning the packed surface from end to end and from left to right.

FIG. 2 shows how the laser-scanner 5 and imaging device 9 are attached to the inner wall of the vessel. The laser-scanner 5 comprises a laser source 7, e.g., of He-Ne laser or semiconductor laser, and a laser scanner 8 that scans left to right and back and forth. The laser beam direction can be changed by gradually changing the inclination of an optical means such as a prism. Since the catalyst particle packing operation produces catalyst dust, the laser source 7 and the laser scanner 8 are located inside and immediately below a dust cover 17 which in turn is connected to an air line 16. An air stream from the air line 16 constantly flows through the dust cover 17 to keep off the dust. The dust cover 17 is secured to the inner wall of the reaction vessel by suitable fittings 18. Similarly, the imaging device 9, typically a CCD camera 10, is located in a dust cover 19 which is connected to an air line 16, and is fixed to the inner wall of the vessel by fittings 20. They are supported on a tray that supports a distributor (not shown) in the center.

Figure 3:
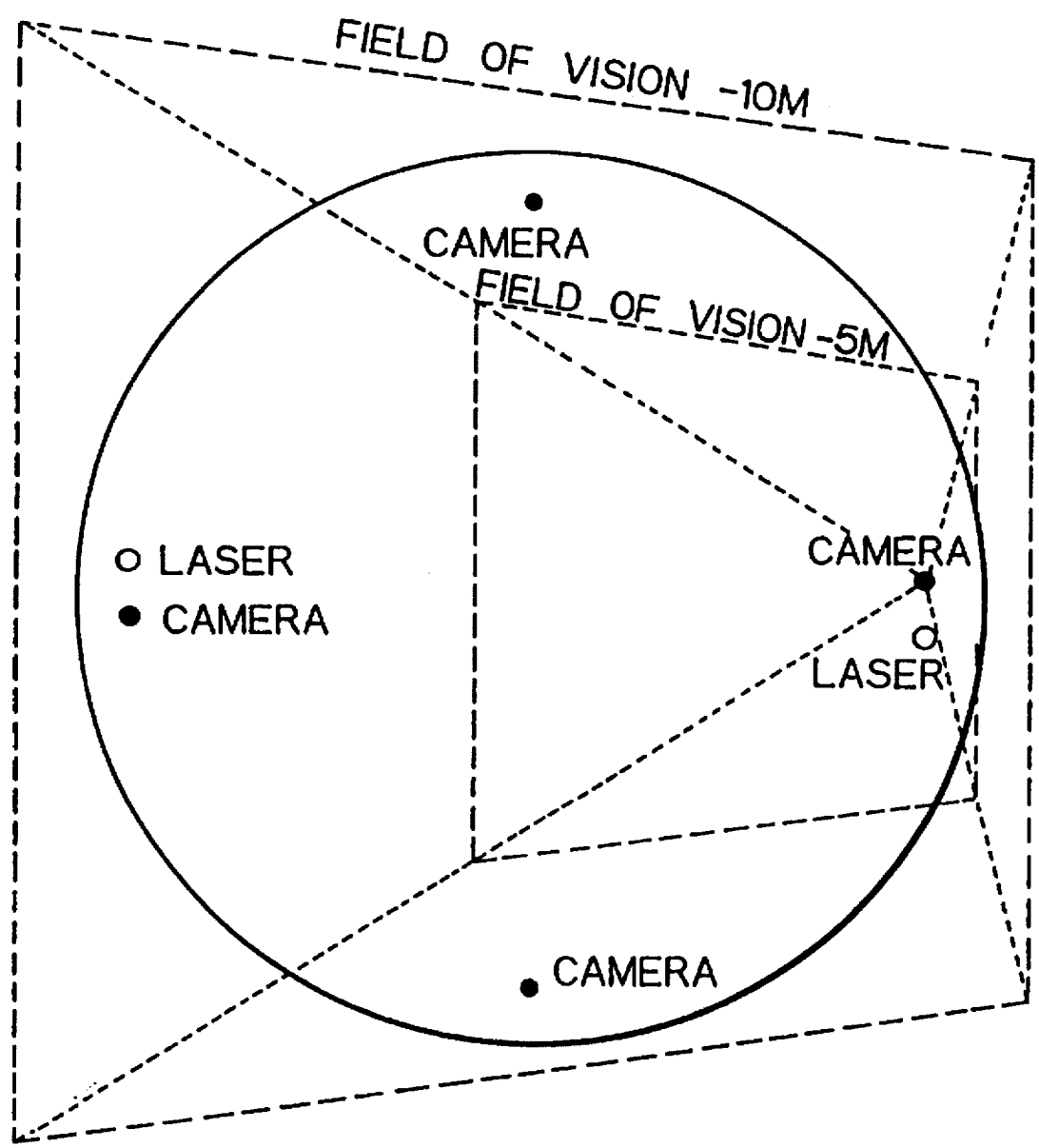
FIG. 3 shows an example of laser and camera arrangement of a four camera-two laser system, with visible fields of −5 m and −10 m indicated by broken lines.

The visual field of the camera depends on the inside diameter of the reaction vessel, the image size of CCD, focal distance of the camera, and the distance from the camera to the packed surface. For example, with the inside diameter of the reaction vessel=4 m, CCD image size=½ inch type, and a photographic lens of focal distance f=12 mm, the visual field in the vertical direction of the recovered image is 3 m when the packed surface distance is −10 m and 1.5 m when the packed surface distance is −5 m. Thus there can be a situation in which it becomes impossible to monitor the whole scene inside the reaction vessel throughout the entire time zone. In that case, a plurality of cameras, and sometimes a plurality of laser-scanners may be used instead. For example, when a photographic lens with a focal distance of 9 mm is employed, a four camera plus two laser system, three camera plus one laser system, or the like may be considered appropriate. FIG. 3 shows a four camera-two laser system. The fields of vision with −5 m and −10 m are indicated by broken lines. The four camera-two laser system, which allows a wider spacing between each camera and laser than the three camera-one laser system, permits broader range, higher accuracy measurement.

In the measurement of a packed surface by laser beam scanning, the laser beam must, without fail, reach the packed surface on the bottom of the vessel. The beam must not be interrupted by the catalyst particles that are falling down through the space of the vessel. In an experiment on simulated closest packing with catalyst particles, the probability of presence of catalyst particles was calculated. For the calculation, it was assumed that the size of catalyst particles was 1.27 mm in diameter and 3 mm long or 2.12 mm in diameter and 5 mm long, the packing rate was 600 mm/h, and the distance between the measuring point of the vessel to the lowermost layer of the packed surface was 10 m. The results showed that a laser beam with a small diameter was interrupted once in about several seconds. When the laser beam diameter was increased beyond the cross sectional area of the catalyst particles, preferably more than 10 times the particle size, unobstructed measurement of the packed surface by laser beam scanning was made possible. The upper limit of laser beam diameter should be determined in consideration of the required measurement accuracy (less than several centimeters) and luminance of the laser scanning points. For the purposes of this invention, the upper limit usually ranges from 2 to 3 cm for ordinary reaction vessels. For example, to achieve an accuracy of 5 cm, the upper limit of the laser beam diameter is 3 cm. Here, by the cross sectional area of catalyst particles is meant the maximum projection area of the (the maximum value of the area of the shadow that is formed upon irradiation of the particles with parallel light).

Figure 4:
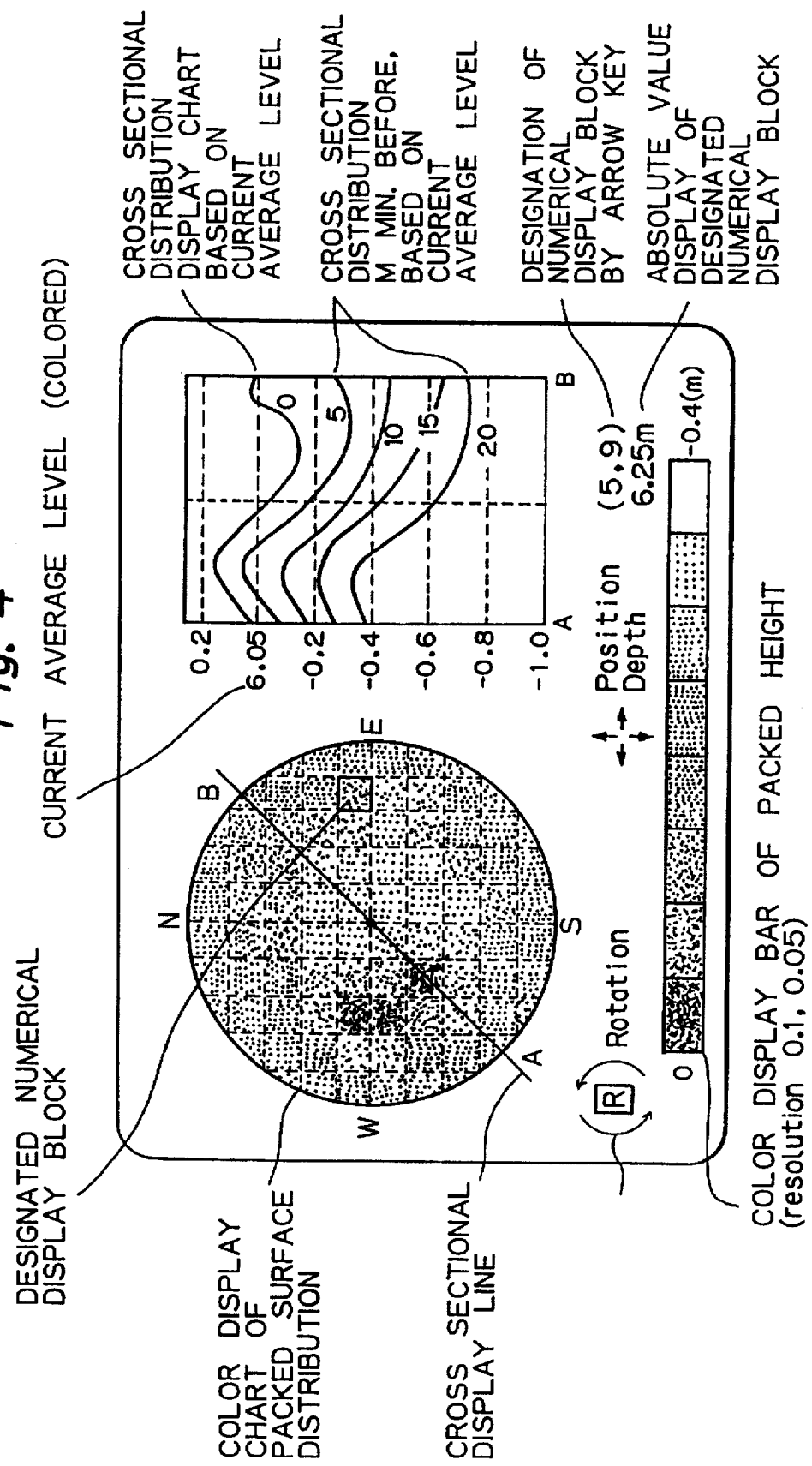
FIG. 4 is a basic screen layout of a packing monitor.

The control of the laser scanner, processing of image from the imaging device, and trigonometric calculation are done by an exclusive computer. The processed data are stored in a magnetic disc, magneto-optic disc, or other storage means while, at the same time, displayed in real time on a CRT screen. The CRT screen can present various pieces of packing information. FIG. 4 is a typical example of basic screen layout of packed surface monitoring. It gives real-time display of the distribution state of the packed surface, a certain selected packed surface section and the like. On the basis of the information of packed surface distribution thus obtained, the condition of scatter from the distributor is modified to keep the distribution of the packed surface constant.

In actual observation, image processing is recommended so as to process a large quantity of voluminous data within a short time while maintaining the accuracy and distinguish between deposited particles and falling particles.

Figure 6:
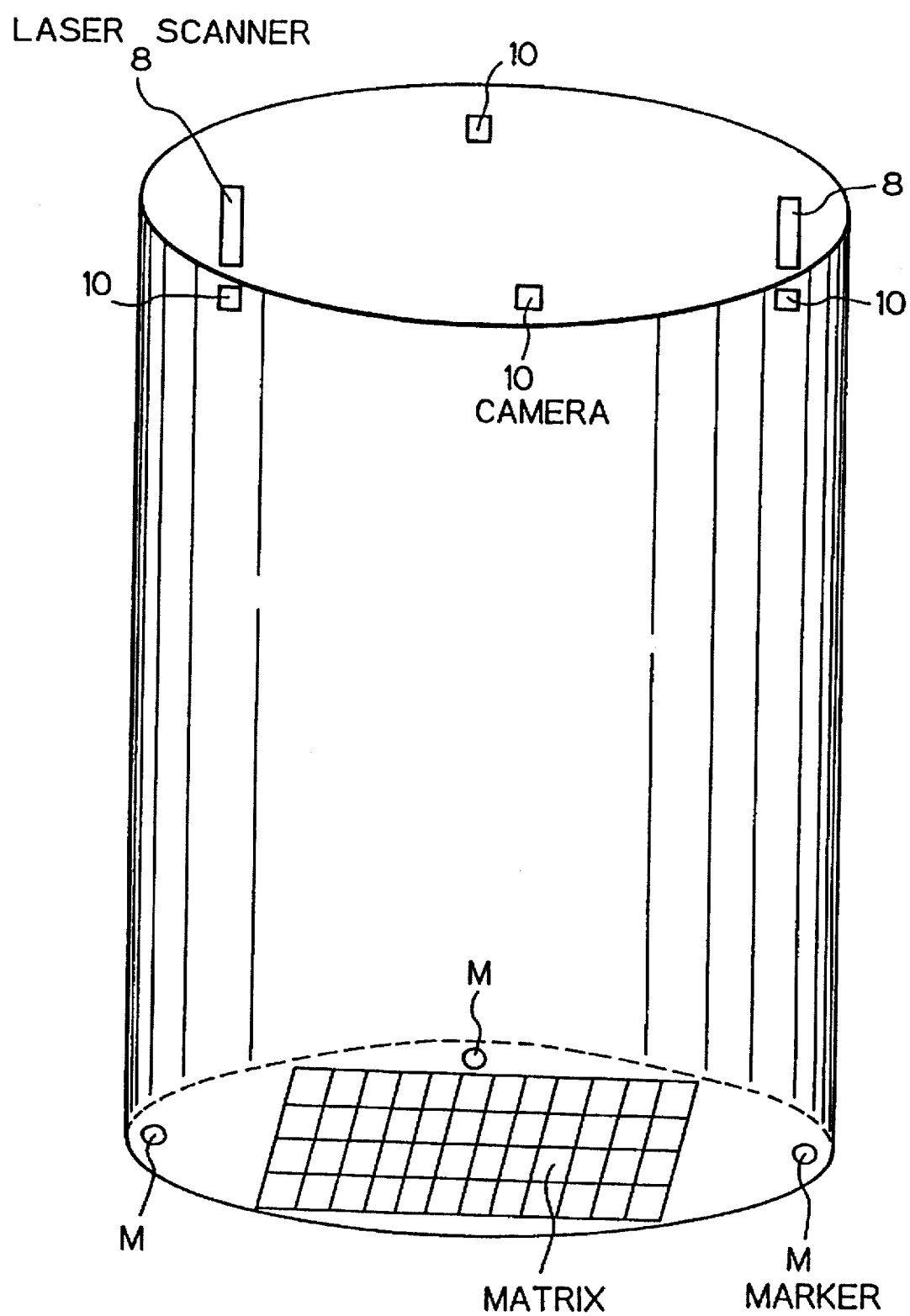
FIG. 6 is a schematic layout illustrating the image pickup angles of cameras, swing angles of laser scanners, absolute coordinate system of markers at three points, and matrices.

For the above purposes a convenient procedure for monitoring particle packing is as follows. First, as FIG. 6 shows, the absolute coordinate system of cameras 10 and laser positions, image pick-up angles of the cameras 10, angle of swing of the laser scanners 8, and the absolute coordinate system of markers M at three points are input as initialization. Thereafter, the laser spots are aligned with the markers, the marker positions are determined by an image processor, and the mounting directions of the laser scanners and the orientations of the cameras are corrected. From the absolute coordinate system data the scanning range on the bottom surface (deposit surface) is calculated.

The scanning range is partitioned into matrices of m×n, e.g., 10×10, and points on each matrix are sequentially irradiated with a laser, so that the particle deposit surface is scanned with laser light. Which point is irradiated with which laser, and which camera is used to obtain which laser image are tabulated beforehand. With the progress of particle packing, the deposit surface rises gradually, causing changes in the visible fields of the cameras and lasers. Therefore, the table of camera-laser combinations can be changed with the height of the packed surface. For example, 20 different combination tables with heights at an increment of 1 cm may be prepared so as to change the combination table with the gradual rise of the packed height.

The laser image of each point on each matrix is taken by a camera. Since the scanning must be performed within short time, e.g., to scan 10×10=100 points in 30 seconds or less, it is possible to take at most several ten frames per point, usually only at most several frames when the time required for image processing is taken into account. Taking 3 or more frames from viewpoint of accuracy and 10 frames or less by reason of processing time is recommended.

The particles that are scattered and deposited inside a vessel fall down at a mean space density that is dictated by the quantity scattered, size and rate of fall of the particles, capacity of the vessel, etc. The exposure time per frame of image varies with the number matrices, scanning time, image processing time, etc., but is usually as short as far less than a fraction of a second. Nevertheless such a large number of particles pass across the laser light path in each frame that they look twinkling.

Figure 7:
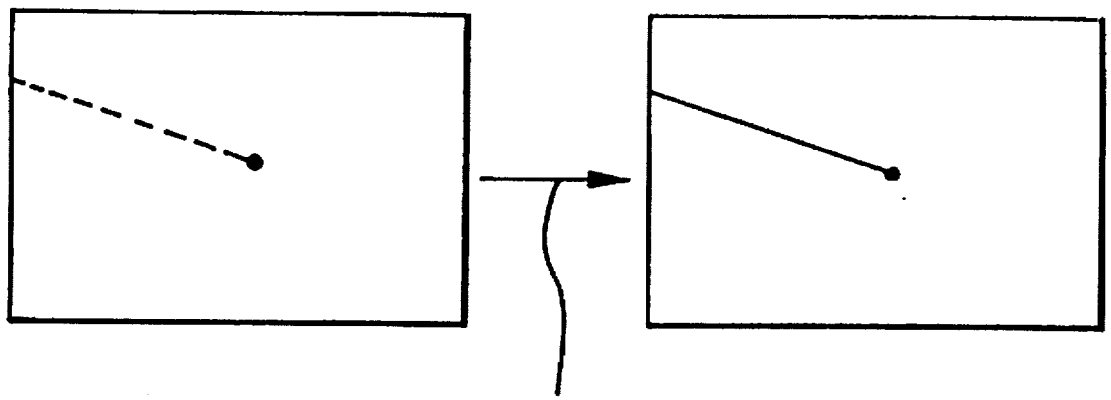
FIG. 7 illustrates that integration of frames of images gives a continuous line of the luminant spots of scattered particles passing across a laser light path.
Figure 8:
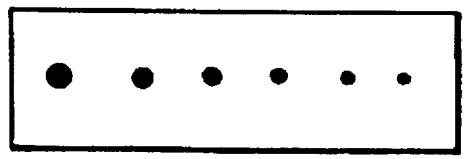
FIG. 8 shows examples of images of laser spots registered beforehand.

A frame memory associated with each camera is composed of rows and columns of pixels. Particles coming across the laser light path produce luminant spots, e.g., one at every several pixels. Thus, on integrating the images of several to 10 frames, the luminant spots by a scattering particle are changed into a continuous line as shown in FIG. 7. An image closest to one of the laser spot images registered in advance as in FIG. 8 is selected, the center of gravity of the image is found and is used as a coordinate of the laser spot. To shorten the time required for image processing, only a certain area around the point which is expected from calculation to receive the laser spot is subjected to image processing. It is only necessary to perform image processing of a range from that point of at least one half of the maximum value of unevenness (in the depth direction) of the deposit surface, i.e., a square-shaped range in which each side is equivalent to at least the maximum value of unevenness (in the depth direction) of the deposit surface. The maximum value of unevenness of the deposit surface is renewed each time the m×n matrices are measured. In the initial state of scatter (until the particles deposit to the maximum (target) value of unevenness of the deposit surface required by scattering), the maximum value of unevenness of the deposit surface may be substituted for by the maximum (target) value of unevenness of the deposit surface required by scattering. Not only at the start of scatter but until the completion of the operation, image processing may be carried out with the above value at the constant level instead of using the maximum value of unevenness of the deposit surface. For example, image processing may be limited to the circular range of a radius of about 40 cm to 1 m from the point where laser spotting is anticipated.

Figure 9:
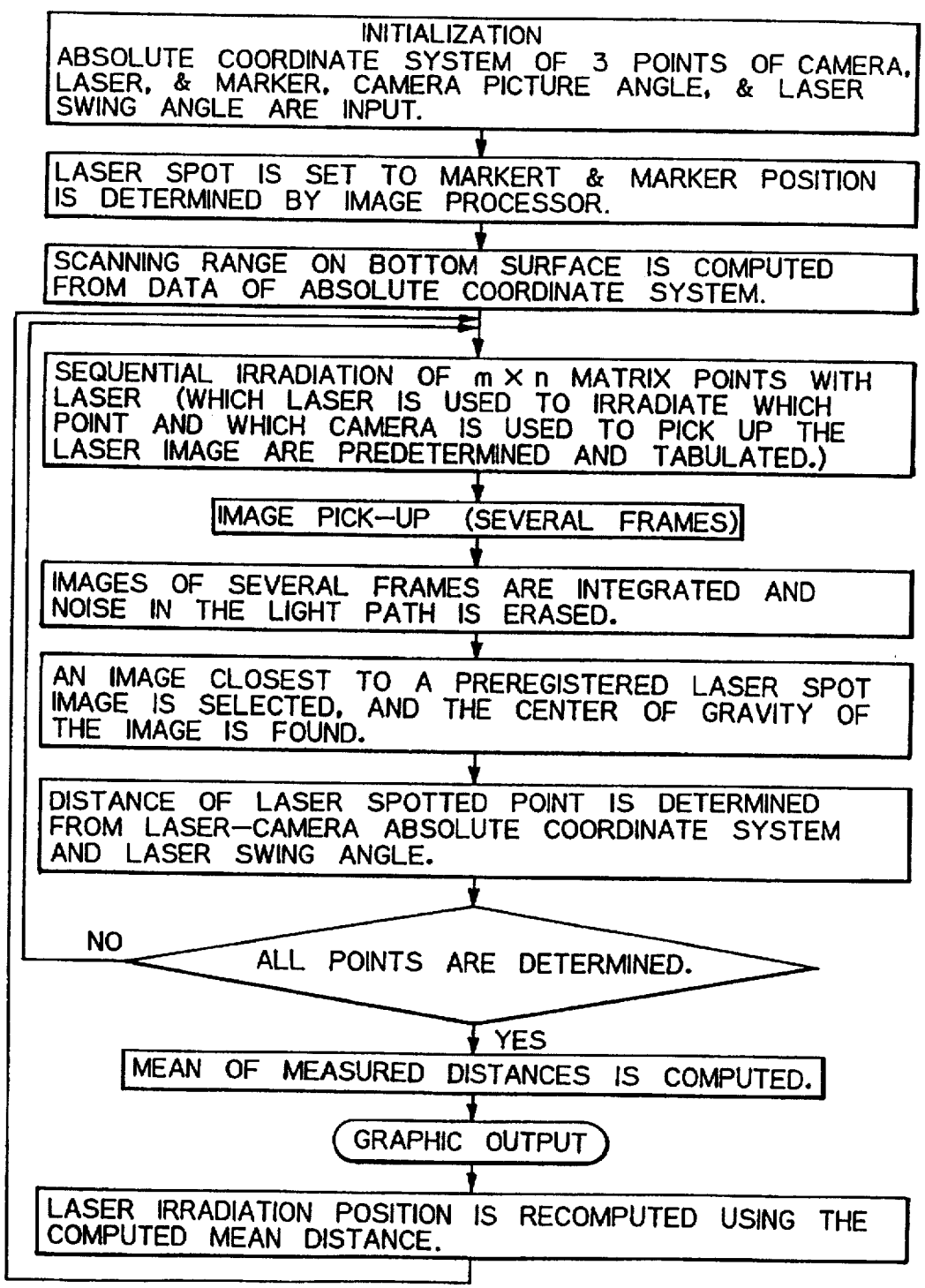
FIG. 9 is a flow chart of image processing.

Following the image processing, the distance of the point upon which the laser is incident is calculated from the absolute coordinate system of lasers and cameras, the angles of swing of the lasers, and the coordinates of laser spots. This scanning is repeated at all the points of matrices. Upon completion of measurements at all the points, the mean of the measured distances are calculated to be a reference value for the next laser measurement, and the laser irradiation point is calculated again. This is followed by graphic outputting. The sequence of image processing steps is represented by a flow chart in FIG. 9.

An instance of actual operation will now be given. A packing apparatus was fixed to the inner wall of a cylindrical vessel of steel about 3 m in diameter and about 18 m high, at a depth of about 5 m from the top of the vessel. Columnar ceramic catalyst particles 0.5 to 1.5 mm in diameter and 3 to 5 mm long (with a cross sectional area ranging from 0.0152 to 0.0783 cm$^2$) were scattered in the space at a deposition rate of about one meter per hour. The deposit surface was scanned with laser beams, and the unevenness of the deposit surface were measured. Matrix measuring points numbered 10 by 10, or 100. The measurement interval was once in about 30 seconds. Images were taken at the rate of 5 frames for each point. Semiconductor laser beam scanning and triangulation with CCD cameras were used for the measurements. The laser beam used was a semiconductor laser at 30 mW. The laser beam diameter was 10 mm. The cameras used were monochromic CCD cameras with a focal distance of 8 mm, ½, 380.000 pixels (minimum subject illuminance: 0.2 lux). A 512×512 pixel image processor was employed. As for the recognition accuracy, laser spot coordinates were found in an increment of 0.1 pixel. The exposure time for the cameras was 1/60 second per frame. Only the range at a radius of 40 cm to 1 m from the point calculated to receive the laser spot was image processed. A measurement accuracy of ±17 mm was obtained at a distance of 10 m from the deposit surface and an accuracy of ±10 mm was obtained at a distance of 5m.

Smoothing the packed surface involves much difficulties even with the use of such a particle packing apparatus comprising a distributor capable of adjusting a scatter parameter and a packing monitor capable of continuously monitoring the packed surface. Establishment of a method for simply realizing the smoothing of packed particle surface using such an apparatus has been looked for in the art. According to this invention, the smoothing of packed particle surface can be simply realized by gradually reducing the size of the cone of packed surface that is produced by a particle packing apparatus comprising a particle distributor and a packing monitor, the distributor being capable of forming a concave-conical packed surface upon scattering of particles in a steady state (e.g., in an uncontrolled condition) and having a parameter with which to control the size of the cone. While the packing monitor continuously watches the formation of the packed surface, the distributor scatters the particles in a steady state and forms a concave-conical packed surface. Thereafter the parameter of the distributor is controlled intermittently or continuously to reduce the size of the cone gradually and deposit smaller packed surfaces inwardly of the preceding packed surface at predetermined intervals or continuously so that the entire packed surface is smoothed.

Figure 10A:
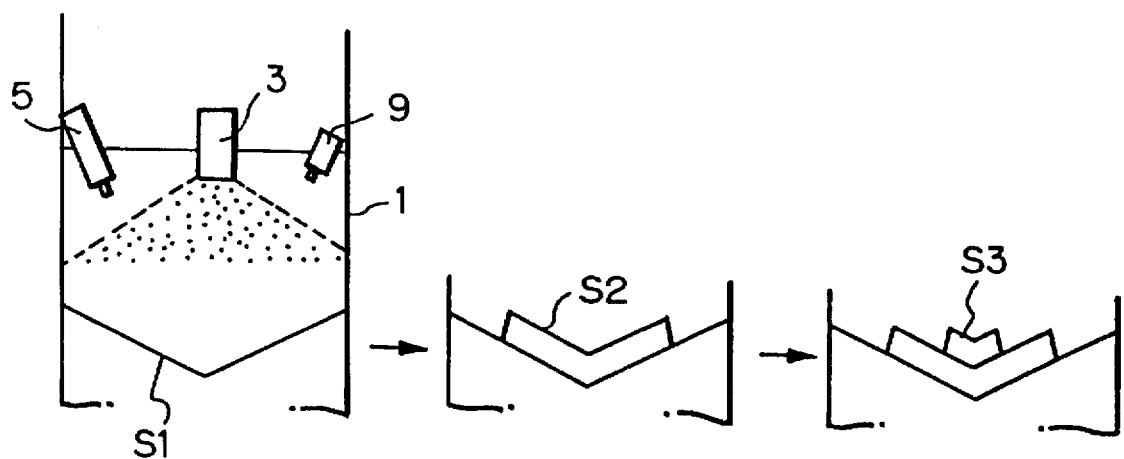
FIG. 10(a) is a series of schematic views representing the concept of packed surface smoothing according to the invention.
Figure 10B:
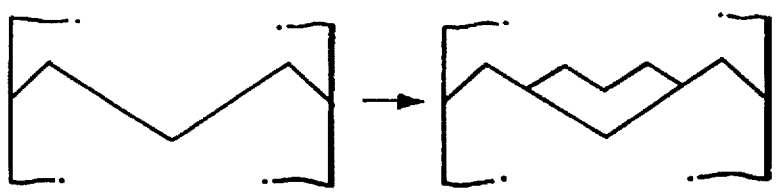
FIG. 10(b) shows an example of packed surface that is difficult to smoothen and FIG. 10(c) shows a definition of conical packed surface.

FIG. 10(a) is a schematic view illustrating the concept of packed surface smoothing or flattening according to this invention. Scattering particles by a distributor in a steady state forms a concave-conical packed surface S1. Next, a second concave-conical packed surface S2 with a smaller cone is formed inside the first cone, and then a third concave-conical packed surface S3 with a much smaller cone is formed inside the second cone. Although three packed surfaces are shown here, actually a smooth packed surface can easily be formed through finer stepwise or continuous control of scattering. If, for example, an uneven packed surface as shown in FIG. 10(b) is formed, the peripheral portion of the scatter range that is sloped outwardly must be taken into account since it makes smoothing difficult.

The operation of smoothening the packed particle surface may be repeatedly made.

Taking the controllability for the smoothing or flattening the packed surface into consideration, it is preferable to do smoothening of the packed surface so that the profile of a conical packed surface S1 formed by scattering particles in a steady state becomes $2 \geq h(edge)/h(ct) \geq 1$. When the profile of the conical packed surface S1 formed is out of this range, the smoothening of the packed surface becomes difficult, and particularly in the case of $h(edge)/h(ct)<1$, the smoothening of the packed surface becomes almost impossible. Also, in the case of $h(edge)/h(ct)=1$, any affects possibly to cause $h(edge)/h(ct)<1$, and so it is preferable to make the operation with $2 \geq h(edge)/h(ct)>1$, if possible. Accordingly, it is desirable that to use a particle packing apparatus which can be easily controlled so that while the particles are packed over a given packing height thereof, the profile of a conical packed surface formed by scattering particles in a steady state is in the range of $2 \geq h(edge)/h(ct) \geq 1$ by the controlling the parameters of the particle packing apparatus.

Thus, the smoothening of the packing of the particles is made while varying the profile of a conical packed surface formed by scattering particles within the range of $2 \geq h(edge)/h(ct) \geq 1$.

Figure 10C:
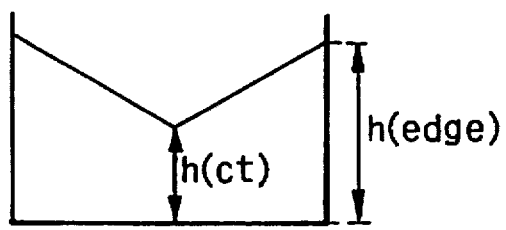

Here, h(edge)/h(ct) is the ratio of the height at the edge or periphery h(edge) to the height at the center h(ct), when the scattering is continued in a steady state for a given time period, at a certain height of the range over which the particles are packed into the packing vessel as shown in FIG. 10(c).

Figure 24:
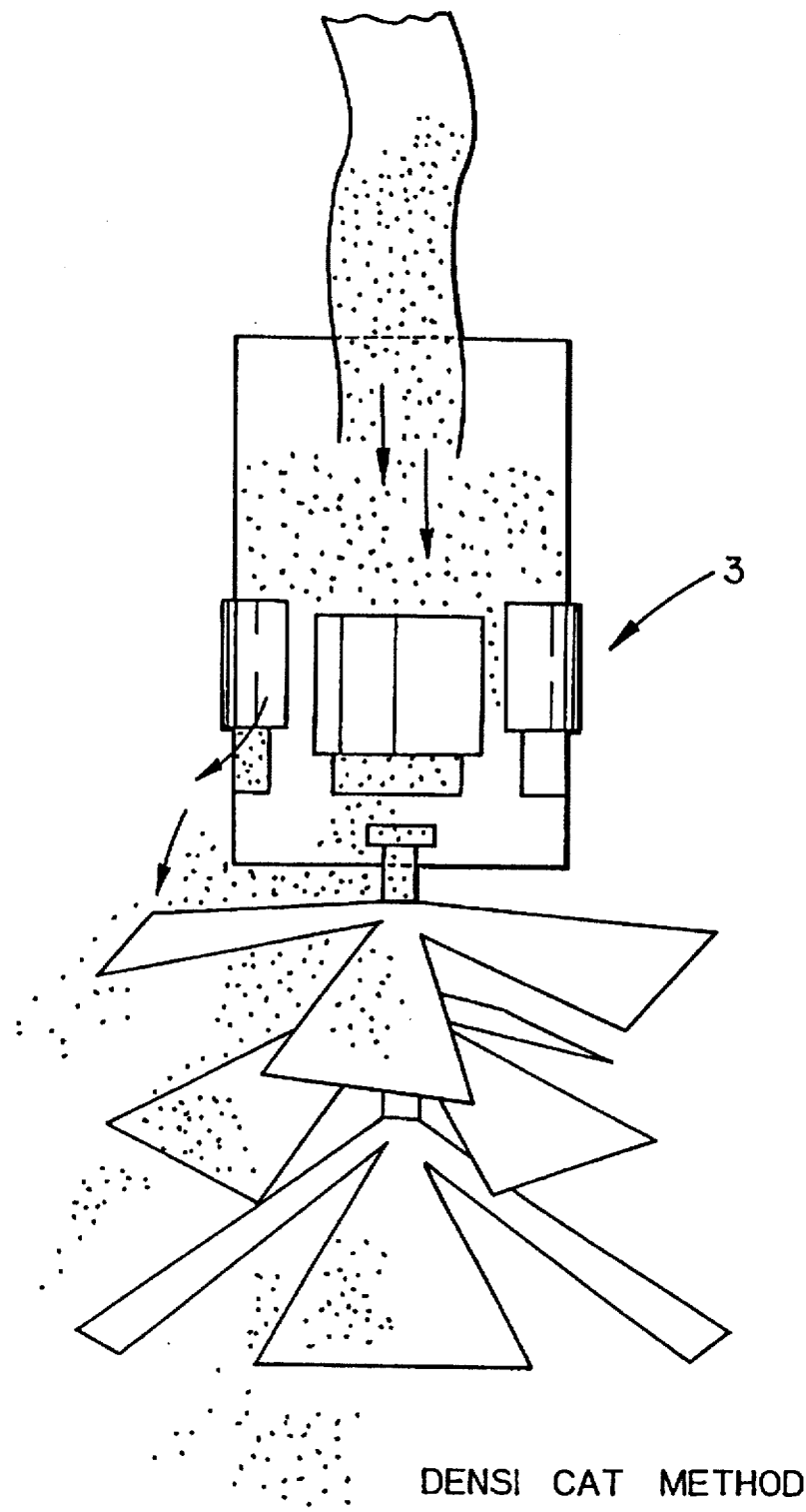
FIG. 24 is a schematic view of a catalyst distributor of "Densi Cat" type.
Figure 25A:
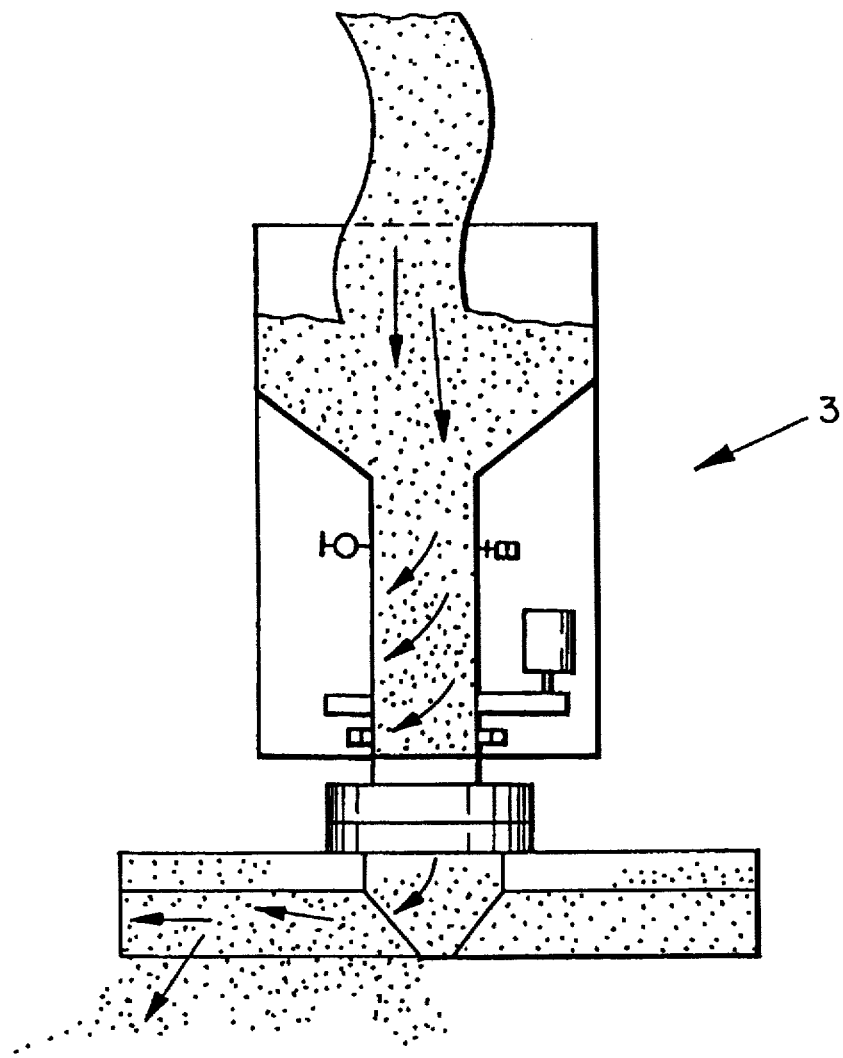
FIG. 25(a) is a schematic front sectional view of a catalyst distributor of "UOP" type.
Figure 25B:
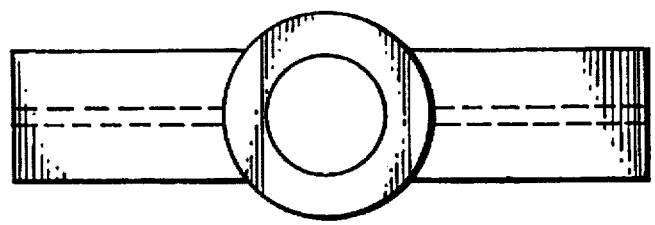
FIG. 25(b) is a schematic top view of a blade.
Figure 26A:
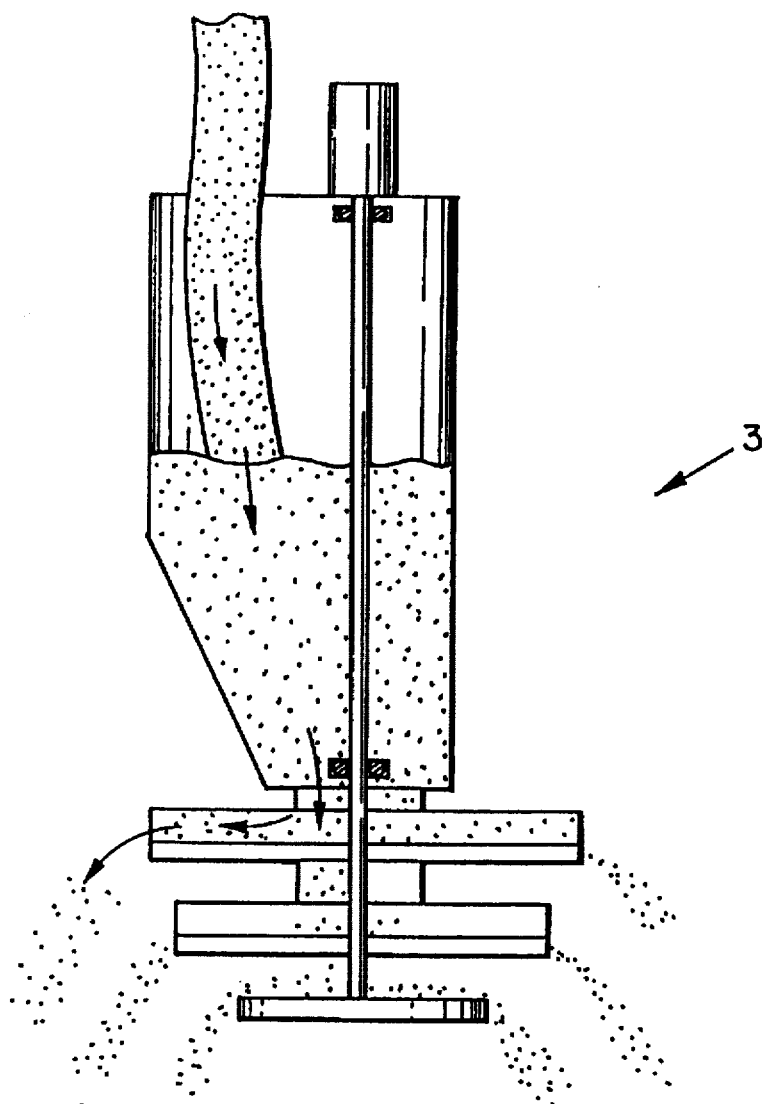
FIG. 26(a) is a schematic front sectional view of a catalyst distributor of "COP" type.
Figure 26B:
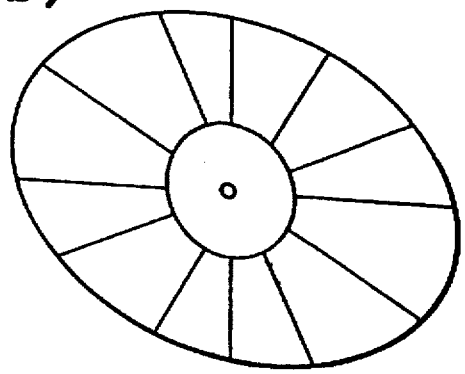
FIG. 26(b) is a schematic top view of a blade assembly.

The parameter for changing the scatter condition of the particle distributor varies with the distributor type. The radius and quantity of distribution can be changed, with the distributor shown in FIG. 5, by adjusting the number of revolution of the rotating disc, with the distributors shown in FIGS. 24 to 26, by adjusting the number of revolution of their rotating blades, and with the distributor shown in FIG. 11, by adjusting the number of revolution of the rotating disc. Alternatively, the rotating disc (blade assembly) may be replaced stepwise by those of different diameters. As a further alternative, the quantity of particle supplied to the rotating disc (blade assembly) may be gradually adjusted. Such a parameter is changed for surface smoothing while the powder scatter condition is being watched through the display of the packing monitor. Since in the prior particle scattering apparatus as FIG. 5 and FIGS. 24 to 26, h(edge) /h(ct) may be widely changed according to the height of the packed surface, it is necessary to change the parameters such as the number of revolution and the quantity of particle supplied according to the height of the packed surface.

Figure 11:
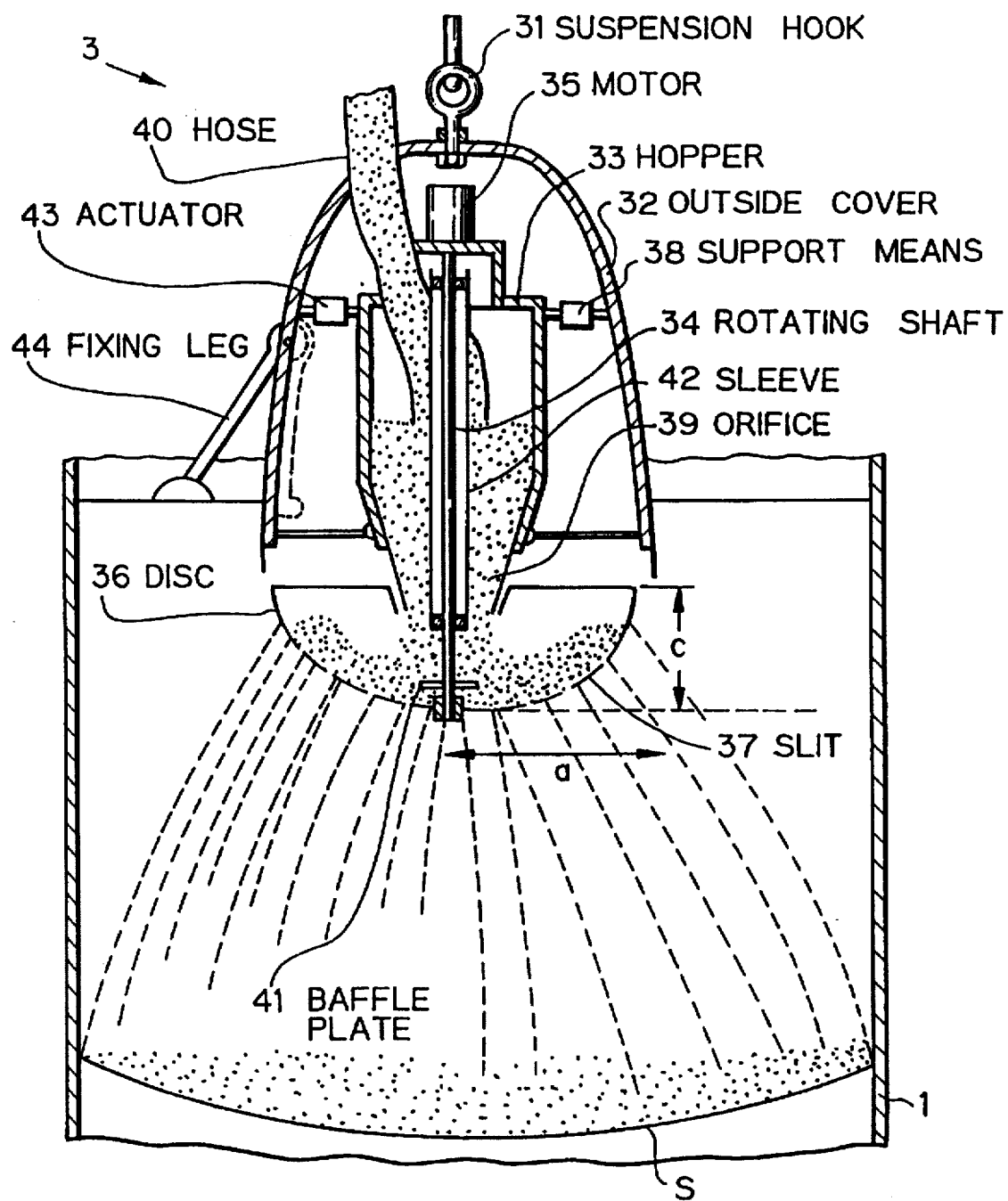
FIG. 11 is a front elevational view, partly in section, of a preferable particle distributor for use in the present invention.

In FIG. 11 is shown a typical distributor (loading machine) to be desirably used in this invention. The distributor 3 is provided with an outside cover 32. In the center of the space defined by the cover 32, a hopper 33 is supported by the cover with support means 38. The hopper 33 is connected to a stocker (not shown) with a hose 40. A rotating shaft 34 extends downwardly through the center of the hopper 33 and projects beyond the lower opening of the hopper. The opening at the lower end of the hopper that surrounds the rotating shaft 34 forms an orifice 39 through which particles are allowed to fall. A rotating disc 36 that constitutes about a half of a uniaxial spheroid is fixed, with the head down, to the lower end of the motor rotating shaft 4 so as to receive the particles falling from the hopper. In the embodiment shown, the hollow rotating disc is closed except for an opening into which the orifice 39 fits. The bottom of the rotating disc 36 has a number of slits 37 to release particles. Each slit is so shaped that the path of particles through it is a locus represented by the sum of a locus of a particle that has fallen from the hopper onto the center of the uniaxial spheroidal disc moves until its movement reaches the speed of the disc under the action of the rotational force and the function of the locus in which the angle of retardation in the rotating direction with respect to the distance of radial movement from the center of the disc agrees with the required quantity of particles to be scattered in the radial position.

The orifice diameter is replaceable, and its maximum conductance must be 80% or less than the slit conductance of the rotating disc to prevent the retention of particles on the disc. The hopper size is governed by the orifice diameter. The motor may be either an electric or air motor, but sufficient torque is a requisite. The number of revolution is desirably controlled by the servo system or the like, and the operation is preferably program controllable to effect fine speed changes (inching) during packing and thereby smooth the packed surface. Inching is a simple, effective technique to make up for the discrepancy that results from the fact that the slit formed in the uniaxial spheroidal disc in conformity with numerical analysis are actually not completely ideal in shape because of the slit width.

The shapes of the rotating disc and its slits must be such that the distribution of the particles present in the space in the vertical direction immediately below the rotating disc is secondary arithmetic serial, or secondary distribution with respect to the horizontal direction. The configurations of the rotating disc need be a uniaxial spheroid in cross section, and a=b, c<a, preferably 0.3 a<c<a, more preferably 0.5a<c<a, where a and b are radii of the uniaxial spheroidal disc (major and minor axes, respectively) and c is the height (depth) of the uniaxial spheroidal disc. The disc should centrifugally force the particles upward therein, and disc configurations other than those defined above make uniform dispersion of particles impossible or tend to invite particle retention. As regards the slit shape, (1) it is essential that the shape of a slit on given (r, θ, z) should have an area that is a quadratic function of r ($r^2+d$, $r^2+e$, r+f) and (2) the shape superposes (1) with the conveyance curve of the particles. The number of slits is appropriately chosen to ensure uniform dispersion of the particles in accordance with the disc size and distribution capacity.

In order to enhance the particle distribution performance, various modifications may be made, including (a) mounting a baffle plate 41 on the rotating shaft, adjacent to the bottom of the disc, (b) covering and sealing at least the portion of the rotating shaft that extends inside the hopper with a sleeve 42 to prevent the breakage of particles, (c) supporting the hopper tiltably or movably from the outside by means of actuators 43 so that the uniaxial spheroidal disc can be inclined or displaced as desired, (d) provision of a fixing leg 44 to the outside cover, and (e) connecting a suspension link 31 to the top of the outside cover. Where a baffle plate 41 is provided, it serves to disperse particles uniformly without imparting shearing or impact forces. The baffle plate is attached to a seal of the rotating shaft and does not revolve itself. To protect the particles against breakage, it is desirable that the rotating shaft be covered and sealed with a soft sleeve 42 on at least the portion extending inside the hopper. Moreover, the rotating disc is made adjustable in inclination (from +15° to −15°) or is made adjustable in displacement. Actuators 43 make the hopper and rotating disc tiltable together to adjust the inclination of the particle surface. Partially ball joints are suitably used as the actuators 43, with the center of inclination preferably in agreement with the center of the rotating disc (uniaxial spheroid). This arrangement prevents off-center scattering of particles. The actuators may be driven either electrically or pneumatically. The suspending mechanism to be used is a suitable lift equipped with a hook, and a fixing leg 14 is desirably used to prevent rocking or swing at the time of suspending. The fixing leg is retractable for housing inside the outside cover, and may, for example, be a leg-opening type or suspended type, depending on the construction of the packed tower. Further, it is advisable that the fixing leg is made replaceable.

Figure 12:
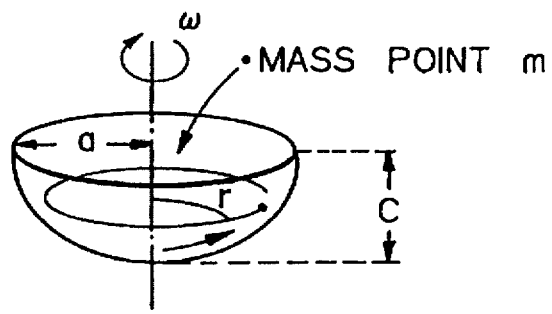
FIG. 12 is a schematic view illustrating the mass point of a rotating disc.

The configurations of the rotating disc and its slits will now be explained. As FIG. 12 indicates, the rotating disc is assumed to be a half of a uniaxial spheroid. When the rotating disc is running at an angular velocity ω a mass point m thrown into it is moved by centrifugal force onto a line of radius r where it is balanced. The radius r may be expressed as $$r = \pm a \sqrt{1 - \frac{g^2 c^2}{\omega^4 a^4}} \tag{1}$$

Figure 13A:
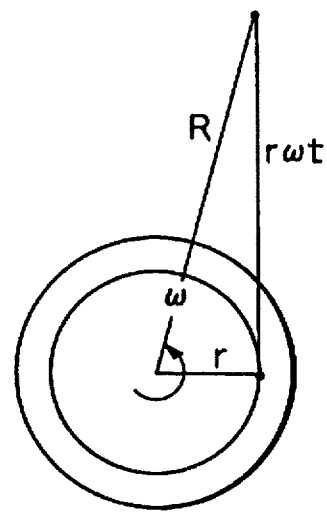
FIG. 13(a) shows particle distribution for horizontal conveyance and FIG. 13(b) for vertical conveyance.
Figure 13B:
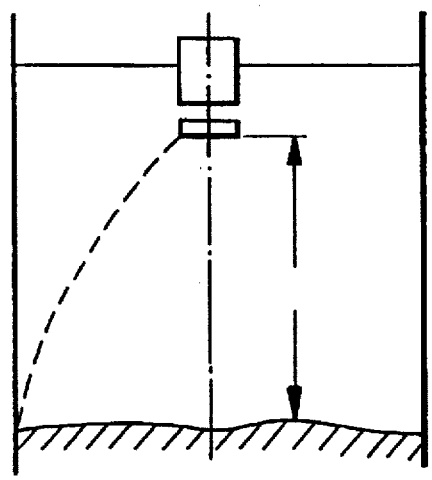

Here r is presumed to be the farthest position of particles in the rotating disc at the angular velocity ω. FIG. 13 (a) shows the horizontal movement of a particle scattered through a slit at a position r away from the center of the rotating disc. The distance of the particle from the center of rotation t second (s) after it has been thrown out at a linear velocity rθ is given by $$R^2 = r^2 + (r\omega t)^2 = r^2(1+\omega^2 t^2) \tag{2}$$

Upon substitution of r of the formula (1), the above formula becomes (3), as $$R^2 = a^2 \left(1 - \frac{g^2}{\omega^4} \frac{c^2}{a^4}\right)(1 + \omega^2 t^2) \tag{3}$$

The time t after which a particle thrown out from a height h in FIG. 13 (b) reaches the packed surface is given by $$h = \frac{1}{2} g t^2 \quad t = \sqrt{\frac{2h}{g}} \tag{4}$$

Substituting this into the formula (3) gives the relation $$R^2 = a^2 \left(1 - \frac{g^2}{\omega^4} \frac{c^2}{a^4}\right)\left(1 + \omega^2 \frac{2h}{g}\right) \tag{5}$$

It will be seen that the scatter range of particles at the angular velocity ω is O–R.

Figure 14:
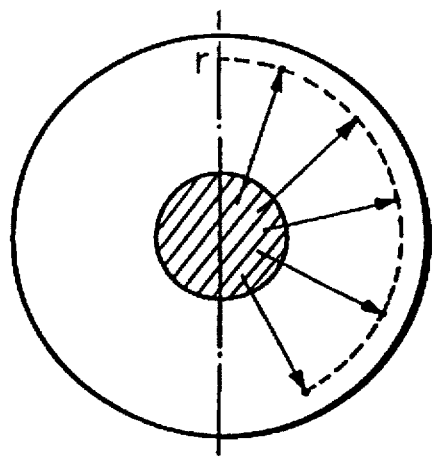
FIG. 14 is a view explanatory of the relation between a particle supply area and conveyance.
Figure 15:
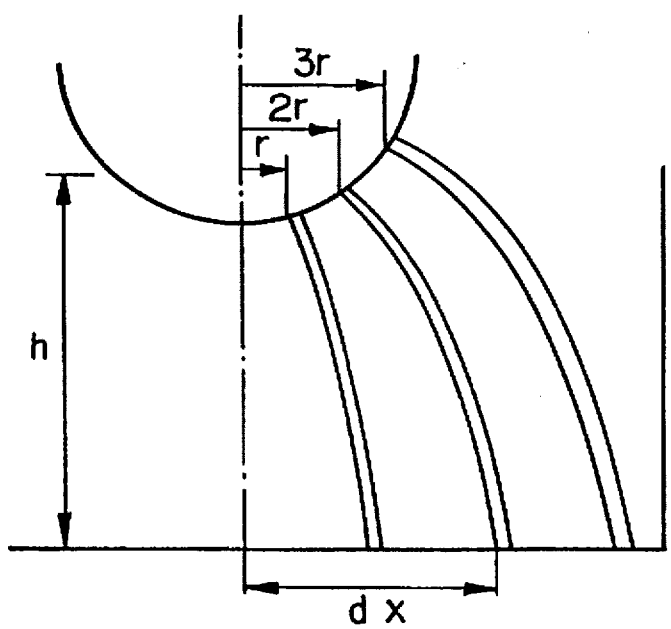
FIG. 15 is a view illustrating a particle scatter range.
Figure 16A:
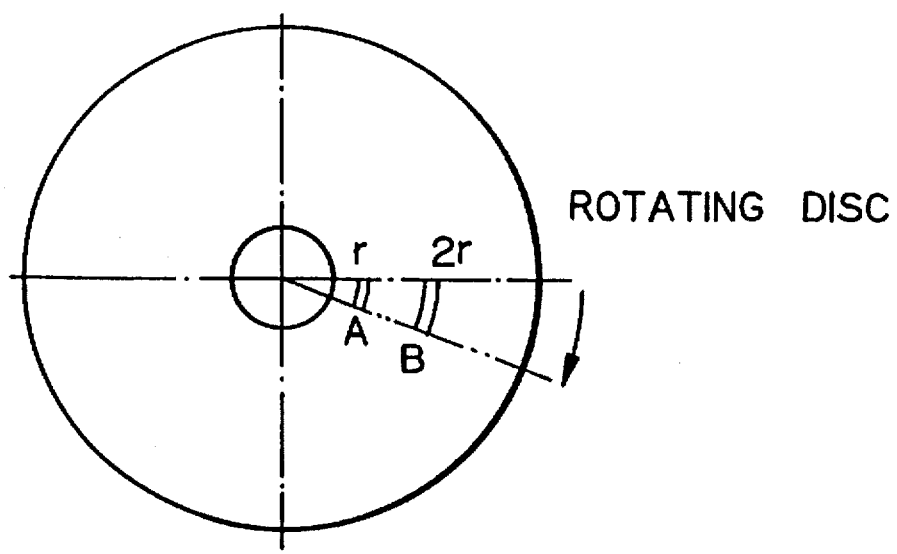
FIG. 16(a) shows a rotating disc and FIG. 16(b) a scattered surface, illustrating the relation between slits and the scattered surface.
Figure 16B:
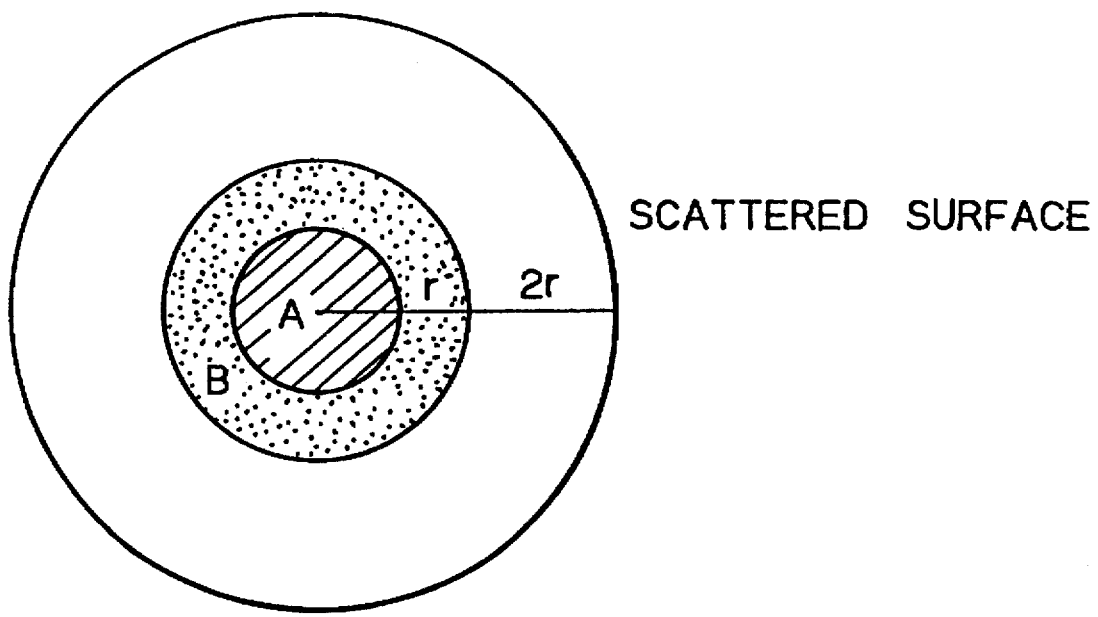

The slits in the rotating disc are required to furnish conditions such that the particles immediately after scattering produce $r^2$ distribution. It has been confirmed from particle scattering experiment that the conductance is constant regardless of the slit positions of the disc (distances from the center of rotation). On this basis the shape of slits in the rotating disc will be considered. To simplify the discussion, it is presumed that each particle that has fallen to $r_0$ is immediately given an angular velocity ω and moves in an instant to the balance point r of the mass point. Particles are continuously supplied to the hatched region in the center of FIG. 14, and then they move to the points r. As FIG. 15 shows, the particles that come out of the slits at radii r, 2r, and 3r generally fall onto points given by $$d_x = r_x \omega t \tag{6}$$

where t is found from the formula (4). Referring now to FIGS. 16(a) and (b), a slit A in the position of radius r scatters particles in the sectorial hatched portion. The scatter range is the region A of the scattered surface. The $d_x$ of the region A is R, and the area $S_A$ is $$S_A = \pi R^2 \tag{7}$$

If the particles in the sectorial hatched portion are scattered through a slit B (2r), the scatter range is the circular region B of the scattered surface. Because the $d_x$ of the region B is 2R, the area $S_B$ of this region is $$S_B = \pi(2R)^2 - S_A \tag{8}$$
$$= 4\pi R^2 - \pi R^2 = 3\pi R^2$$

The quantity of particles that leave the slit A and that of particles leaving the slit B are both supplied in the sectorial hatched portion and are the same. This means that the slit B in the position 2r must be staggered in phase from the slit A, and its angle of opening must be enlarged $S_B/S_A$ times. Ideally, the series solution is $$S_c = \pi(3R)^2 - S_B \tag{9}$$

The fact that the space distribution of particles immediately after scattering is $r^2$ distribution means the first terms of the formulas (8) and (9).

Figure 17:
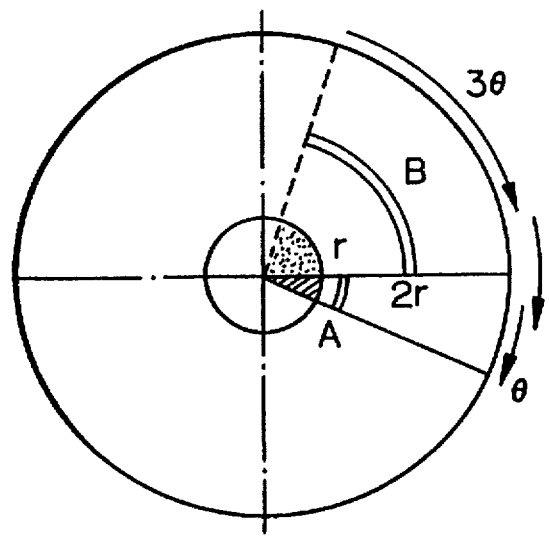
FIG. 17 is a view explanatory of necessary slit opening angles.

If it is assumed in FIG. 17 that all the particles supplied from different supply parts leave corresponding slits, ideal slit shape curves will be the curves of the series shown in the formulas (8) and (9). If they are simplified and the second terms ignored, just the square curves of r will result.

Figure 18:
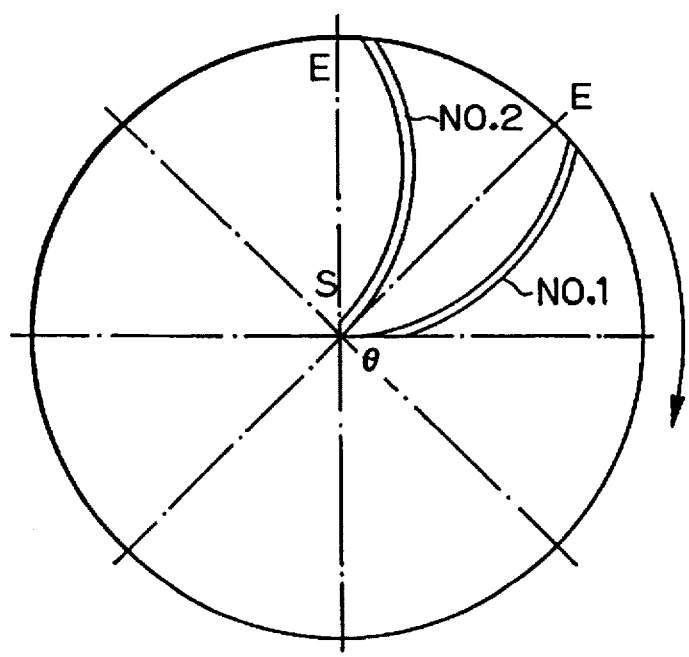
FIG. 18 gives idealized slit curves, showing that the end point E of slit No. 1 overlaps with the starting point S of slit No. 2.
Figure 19:
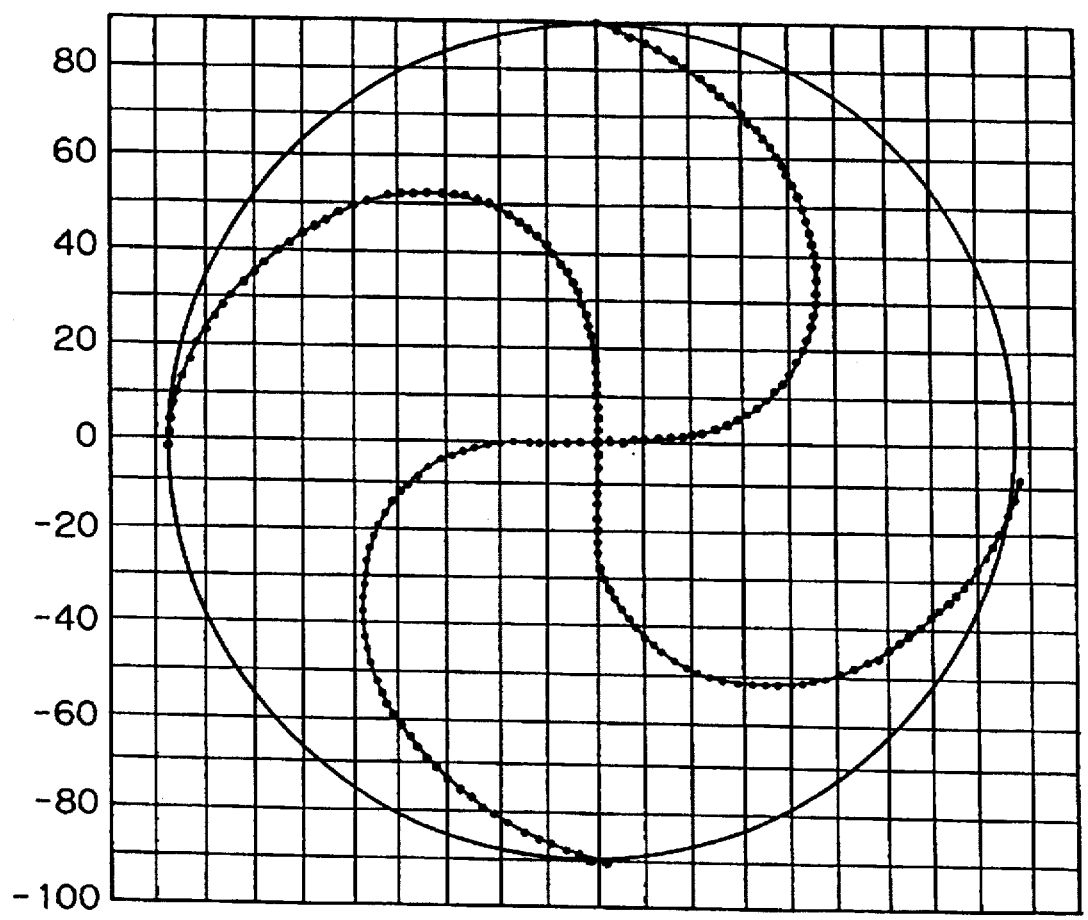
FIG. 19 graphically represents the results of calculation of slit shapes.

It will be seen from FIG. 18 that the condition under which no particle remains on the disc is overlapping of the end point E of slit No. 1 with the starting point S of slit No. 2. The value of the overlap limit r should be the balance point of the mass point at the minimum number of revolution during particle scattering. In addition, the particles collect inside the rotating disc unless the total of slit conductances in the range of $0 < r_x \leq r$ is larger than the orifice conductance. These are the basic factors required of slit shape. The only remaining task is to study the sliding motion of the particles inside the rotating disc and superpose the result with the above factors. FIG. 19 is a graphic representation of the results of exemplary calculation of slit shapes.

Next, the base line of rotating disc must be a curve in accord with the conveyance curve of particles that move inside the disc. Assuming now that a rotating saucer having a radius a (a=b=c) is running at an angular velocity ω, the locus of a single particle that has fallen from the orifice onto a point A at a distance $r_0$ from the axis of rotation will be considered. Here the coefficient of friction (kinetic friction coefficient) between the particle and the rotating disc is constant, and the angular velocity of rotating motion of the particle in the initial state is zero. At the instant of contact between the particle and the rotating disc, the particle is subject to a centrifugal force equivalent to that in the position $r_0$. The centrifugal force is given by $$f_0 = \frac{m v_1^2}{r_0} \tag{10}$$

When the particle and the disc have the same angular velocity in complete friction, $v_1 = \omega r_0$. However, because friction causes a loss in energy transmission, the transmission coefficient of energy, α, must be taken into account. Then, $$v = \alpha \omega r_0$$
$$(\alpha \leq 1 \alpha:\text{Constant}) \tag{11}$$

Thus the centrifugal force $f_o$ is expressed by $$f_0 = m(\alpha\omega)^2 r_0 \tag{12}$$

The balance point of mass point on the rotating disc where a=b=c is given by $$r_1 = \pm a \sqrt{1 - \frac{g^2 c^2}{\omega_1^4 a^4}} \tag{13}$$

Figure 20:
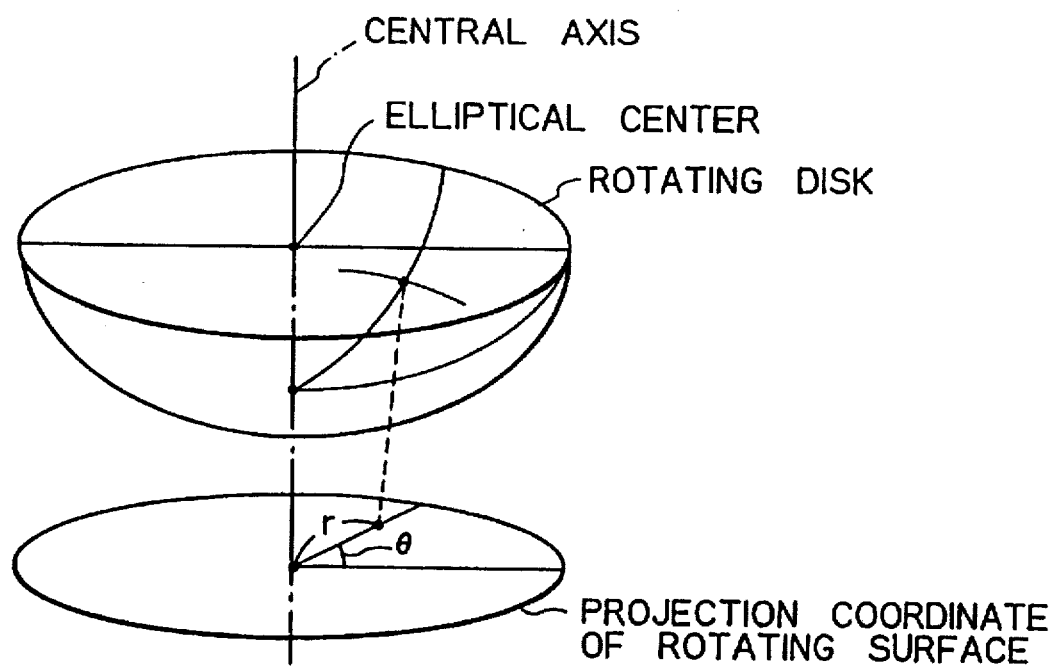
FIG. 20 shows a polar coordinate system upon projection of a rotating disc.

From the above discussion, the relative motion of the particle and the rotating disc in a polar coordinate system where a uniaxial spheroidal disc is projected as in FIG. 20 can be written.

$$\omega = 2\pi m/60$$

$$\theta = x (0 \leq x \leq B)$$

$$r = a \sqrt{1 - \frac{g^2 c^2}{\left(\frac{\omega x}{B}\right)^4 a^4}} \tag{14}$$

where
  r: radial position
  a: major axis of the rotating disc
  c: minor axis of the rotating disc
  g: gravity acceleration
  θ: position in the rotating direction
  ω: angular velocity
  m: steady number of revolution of the rotating disc (rpm)
  B: angle over which the particle has moved to attain the same velocity as the rotating disc The number of revolution of the rotating disc is in actual operation varied with the packed height, but here the number of revolution in the steady state of the rotating disc, m, means the number of revolution to be steadily used. The symbol B stands for the angle over which a particle that fell from the hopper is imparted with a rotational force by the rotating disc and is moved to attain the same number of revolution as the disc, and the angle can be found by calculation.

The locus of movement of the particle that fell onto the center of the uniaxial spheroidal disc moves under the rotational force imparted from the disc to a number of revolution equal to that of the disc can be expressed by the above function (14) in the polar coordinate system.

Also, the function of locus in which the angle of retardation in the direction of rotation with respect to the distance of movement from the center of the disc in the radial direction comes in agreement with the quantity of particles required to be scattered in the radial position can be made the locus expressed, in the above polar coordinate system, by the following function:

$$r_i = \frac{a \cdot i}{n} \quad (i = 0, 1, \ldots n) \tag{15}$$

$$\theta_i = \sum_{j=0}^{n} A \left(\frac{r_j}{a}\right)^2$$

where

A: maximum phase angle of slit (deg.) (A=360/no. of slits)

$r_i$: radial position $\theta_i$: position in the rotational direction a: major axis of the rotating disc n: number of division of slit The function of the locus where the angle of retardation in the rotational direction with respect to the distance of movement from the center of disc in the radial direction comes in agreement with the quantity of particles required to be scattered in the radial position can also be made the locus that can be expressed, in the above polar coordination system, by the following function:

$$r_i = \frac{a \cdot i}{n} \quad (i = 0, 1, \ldots n) \tag{16}$$

$$\theta_i = \sum_{j=0}^{n} A \left\{ \left(\frac{r_j}{a}\right)^2 - \left(\frac{r_j - 1}{a}\right)^2 \right\}$$

where

A: maximum phase angle of slit (deg.) (A=360/no. of slits)

$r_j$: radial position $\theta_i$: position in the rotational direction a: major axis of the rotating disc n: number of division of slit By expressing the shape of a uniaxial spheroid with the aforementioned formula (14), (15) or the formula (14), (16), it becomes to attain a particle packing apparatus by which the the profile of the conical packed surface formed when the scattering is made a steady condition may be easily controlled to 2≧h(edge)/h(ct)≧1.

EXAMPLE 1

Figure 21:
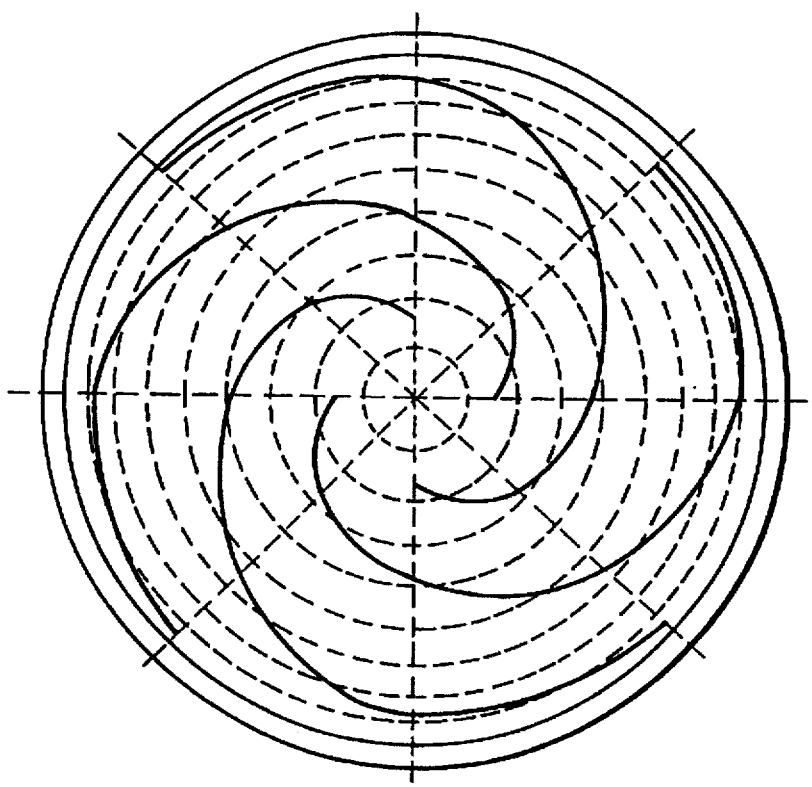
FIG. 21 is a schematic layout of the polar coordinate systems of slit shapes of rotating discs in working examples.
Figure 22:
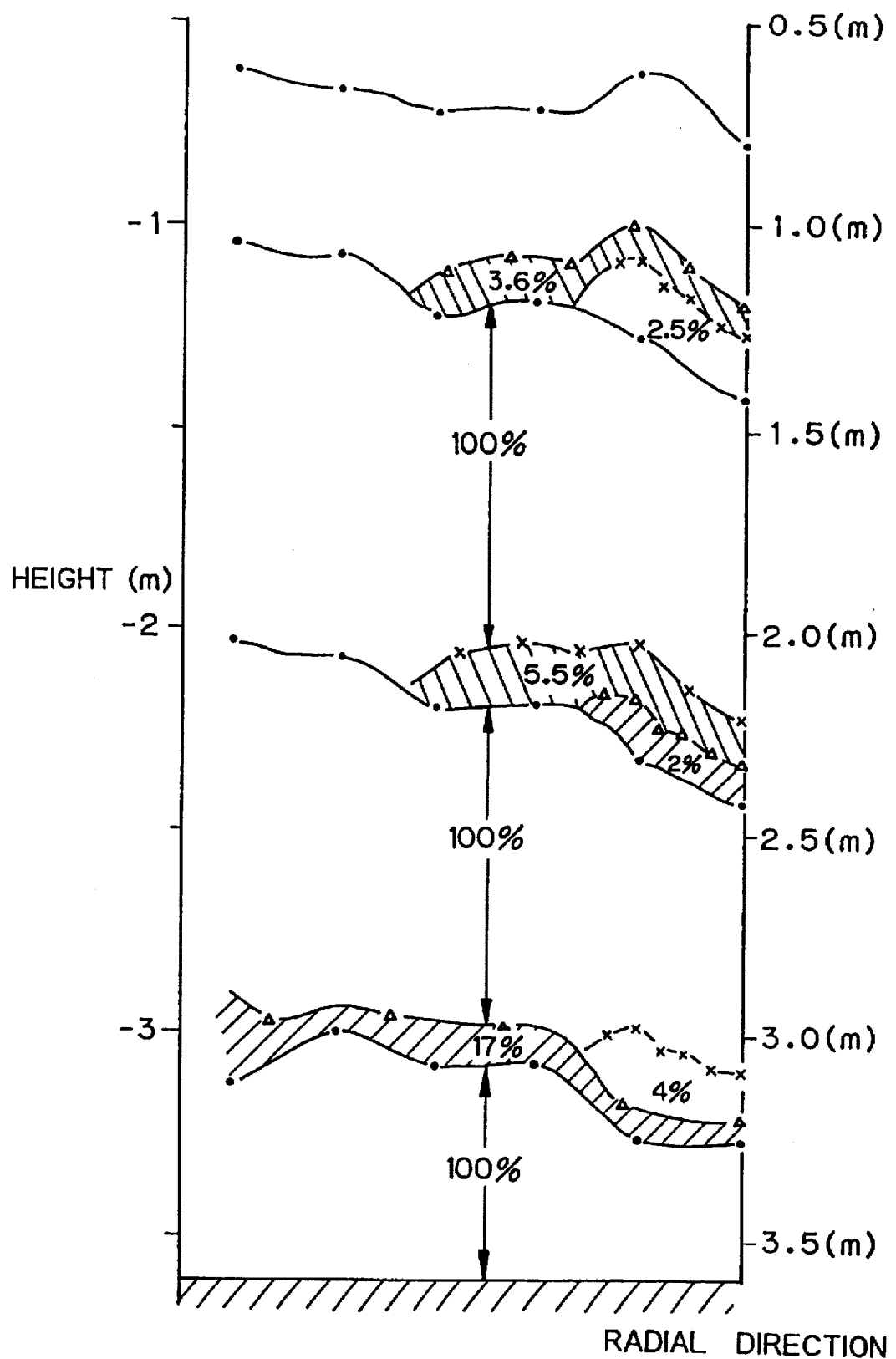
FIG. 22 is a graph showing the deposition patterns of packed surfaces in relation to Example 1.

With a distributor of FIG. 11, the dimensions of the disc were set to a=20 cm and c=12 cm, the number of slits were 4, the width of each slit was 8 mm, and the orifice diameter was 95 mm (The shape of the slits was decided according to the concept said above, FIG. 21.). In a packed tower 4 m in diameter, packing apparatuses were installed at different heights of 2.4 m, 1.6 m, and 0.6 m. At each height, about 1.5 tons of catalyst particles leaving the apparatus, in the form of columnar ceramic particles 0.5 to 1.5 mm in diameter and 3 to 5 mm long (with a cross sectional area ranging from 0.0152 to 0.0783 $cm^2$), were scattered at the rate of 0.125 ton per minute, at a rotating disc speed such that the maximum scatter distance of the particles coincides with the surrounding wall of the packed tower. The catalyst distribution characteristics of the disc were found from the packed surface contours. Table 1 shows the quantities of catalyst particles scattered at different heights in sections based on the fourth section. The scatter region was divided into sections in such a way that the center of the packed tower was the zeroth and the inner wall of the tower was the fifth, the region in between being divided at equidistant intervals from the tower center into the first to fourth sections (FIG. 22). The height is represented on the basis of the packing apparatus set at 0 m. As shown in Table 1, the profiles, h(edge)/h(ct), of the conical packed surfaces formed during scattering at steady condition are controlled to 1 to 2.

TABLE 1

| Height | sections | | | | | | |
|---|---|---|---|---|---|---|---|
| (m) | 0th | 1st | 2nd | 3rd | 4th | 5th | h(edge)/h(ct) |
| 0.65 | 91 | 93 | 89 | 95 | 100 | 109 | 1.2 |
| 1.00 | 80 | 82 | 86 | 91 | 100 | 101 | 1.3 |
| 1.47 | 73 | 74 | 85 | 88 | 100 | 97 | 1.4 |
| 2.40 | 65 | 66 | 89 | 86 | 100 | 87 | 1.5 |
| 3.60 | 56 | 57 | 89 | 86 | 100 | 78 | 1.8 |

In view of the experimental results given in Table 1, the control patterns of catalyst scattering when packing the catalyst to the height from −3.6 m to −1.5 m were simplified as shown in FIG. 22. The method of simplification illustrated in FIG. 22 started with performing uncontrolled scattering from the height of −3.6 m to 3.0 m (with the control of only the number of revolution so that the inner wall surface of the tower was always the maximum scatter distance) with the characteristics based on the data of −3.60 m in Table 1, followed by smoothing of the packed surface at the height of −3.0 m. From the height of −3.0 m to −2.0 m, uncontrolled scattering based on the data of −2.40 m in Table 1 is carried out, and then the packed surface is smoothed at −2.0 mm. Similarly, leveling was done at −1.0 m. The leveling sequences (scatter distance-time ratios) thus attained at the different heights are shown.

The results given in FIG. 22 indicate that a generally flat packed surface is obtained, e.g., at the height of −2.0 mm, by performing scattering for a 2% time period on the basis of the time (100%) required for the packing from −3.0 m to −2.0 m, so that the maximum scatter distance is maintained in the first and second sections, and thereafter performing scattering for a 5.5% time period so that the maximum scatter distance is maintained in the third section.

The scatter ranges and time periods thus obtained are more finely dispersed. For example, in terms of unit time of 5 minutes, the packing from −3 m to −2 m is performed by: a scatter run, in such a way that the fifth section (wall surface) is the maximum scatter distance, for 5 minutes (300 seconds (100%)); a short run, in such a way that the first and second sections are the maximum scatter distance, for 6 seconds (2%); another run, in such a way that the third section is the maximum scatter distance, for 17 seconds (5.5%), and resume the run with the fifth section (wall surface) as the maximum scatter distance. This scatter pattern is repeated, with the result that a smoother packed surface than in FIG. 22 is obtained. Therefore, the profile of the packed surface varies within 2≧h(edge)/h(ct)≧1.

EXAMPLE 2

Using the packing apparatus of Example 1, the catalyst particles of Example 1 were scattered and packed (scatter range: −3.6 m to −2.5 m) in an indirect desulfurization equipment of a three-layer structure (each layer 3.6 m thick) with a tower diameter of 4.1 m and height of 15 m. The bottom of the indirect desulfurization equipment was preloaded with a support catalyst and the packed surface was leveled. The surface on which the catalyst particles deposited was scanned by a laser beam to determine the packed surface condition. The number of measuring points was 100 and the measuring interval was once in 30 seconds. The measurement depended on trigonometric survey of the packed surface by semi-conductor laser beam scanning and photographic observation with a CCD camera. For the laser beam a 35 mW semiconductor laser was used. The camera was a ½ in. 380,000-pixel monochromic CCD camera with a focal distance of 35 mm (minimum subject illuminance: 0.2 lux). A 512×512 pixel image processor was employed. (The laser spot coordinates were found with a recognition accuracy in an increment of 0.1 pixel.)

The basic number of revolution of the packing apparatus (a number of revolution such that the maximum scatter distance at the height of the packed surface is the inner wall surface) was controlled as shown in Table 2, depending on the height of the packed surface. Each packed height in Table 2 represents the distance between the location of the packing apparatus and the packed surface, showing the relation among the maximum scatter distance, packed height, and number of revolution.

TABLE 2

| Packed height | Center | Radial position | | | | Wall |
|---|---|---|---|---|---|---|
| (m) | 0.2 m | 0.6 m | 1.0 m | 1.4 m | 1.8 m | 2.0 m |
| 0.4 | 70 | 132 | 188 | 247 | 309 | 340 |
| 0.6 | 61 | 116 | 172 | 224 | 274 | 296 |
| 0.8 | 52 | 103 | 151 | 194 | 234 | 254 |
| 1.0 | 49 | 96 | 140 | 182 | 219 | 238 |
| 1.2 | 46 | 86 | 131 | 171 | 206 | 224 |
| 1.4 | 44 | 83 | 122 | 161 | 193 | 210 |
| 1.6 | 42 | 80 | 114 | 153 | 185 | 191 |
| 1.8 | 40 | 75 | 109 | 143 | 176 | 183 |
| 2.0 | 39 | 72 | 105 | 138 | 170 | 181 |
| 2.2 | 37 | 69 | 100 | 132 | 164 | 177 |
| 2.4 | 35 | 66 | 98 | 127 | 157 | 171 |
| 2.6 | 34 | 65 | 94 | 122 | 151 | 166 |
| 2.8 | 33 | 62 | 92 | 119 | 147 | 161 |
| 3.4 | 32 | 61 | 89 | 115 | 143 | 155 |

The numerical values are rpm.

Figure 23:
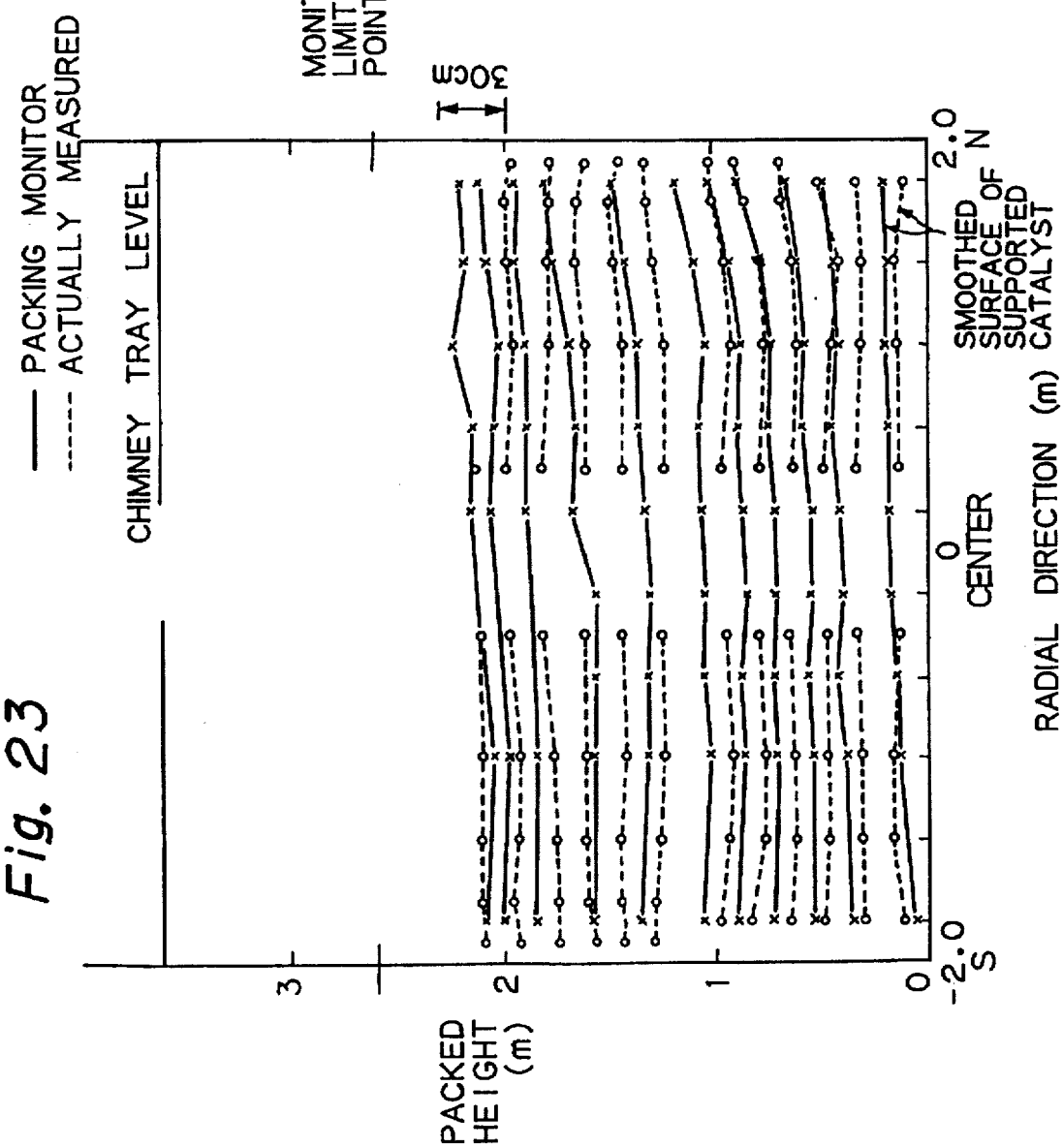
FIG. 23 is a graph showing the results of packing in relation to Example 2, the solid lines representing the results of measurement by a packing monitor of a cross section of packed surface sampled at predetermined intervals of time, and the broken lines representing actual measurement values confirmed by operators with a measuring tape.

The procedure for leveling the packed surface was as follows. With a unit time of 5 minutes and on the basis of the values found in Example 1, measurements were made by a packing monitor. While the packed heights at 100 measuring points that were renewed every 30 seconds were being observed, any excess or short supply of the packed surface was corrected. FIG. 23 graphically represents an example of packing results. The solid lines represent the results of measurements, each with a packing monitor of a cross section of the packed surface extracted at given time intervals (the results therein being extracted at an interval of about 15 minutes from continuously sampled data). The broken lines are actually measured values confirmed by operators with a measuring tape. (Except for the data at the start and conclusion of the packing operation, the data represented by the solid and broken lines were not simultaneously measured and therefore some discrepancies resulted.) In this way, it was confirmed that the high and low levels of the packed surface were confined within the range of about 5 cm as indicated in FIG. 23.

This invention has thus far been described specifically as applied to the monitoring of catalyst particle packing in a reaction vessel. However, this invention is not limited to the examples given above but is extensively applicable to the monitoring of packing of other particles in other vessels, such as packing of grains in silos. The particles to be handled are not specially limited, but desirable particles are non-isotropic ones, e.g., with an aspect ratio (length/width) of 2 or more, that are difficult to control in packing and particularly need to be monitored during packing.

ADVANTAGE OF THE INVENTION

This invention provides a particle packing apparatus which produces a flat packed surface (uniform particle distribution height) without damaging or breaking the particles, typically catalyst particles. The apparatus is easy and simple to control, convenient to handle and install, and realizes high speed particle conveyance. Moreover, it makes the space presence density of particles uniform and realizes high density packing (dense loading). In scanning the particle deposited surface in a vessel with a laser beam, detecting the reflected light, and measuring the deposit height by trigonometry, the copious data can be processed within a short time by image processing while maintaining the accuracy. The deposited particles can be distinguished from the particles being scattered. The smoothing of packed particle surface can be simply realized by gradually reducing the size of the cone of packed surface that is produced by the particle packing apparatus comprising a particle distributor and a packing monitor, the distributor being capable of forming a conical packed surface upon scattering of particles in a steady state (e.g., in an uncontrolled condition) and having a parameter with which to control the size of the cone.

What is claimed is:

1. A method of packing particles in a vessel using a particle packing apparatus which includes a particle distributor capable of forming a concave-conical packed surface upon scattering of particles in a steady state and having a parameter with which to control the size of a resulting cone and a packing monitor capable of continuously detecting the packed surface condition, comprising the steps of:

(a) forming a concave-conical packed surface of the particles scattered in a steady state by the distributor while the packing monitor is continuously detecting the formation of the packed surface, and (b) at least intermittently controlling the parameter of the particle distributor to reduce the cone size gradually to form and deposit, on an inner side of the concave-conical packed surface, successively smaller concave-conical packed surfaces at least at predetermined intervals, whereby a flat, smooth packed surface is formed.

2. A method of packing particles in a vessel using a particle packing apparatus which includes a particle distributor capable of forming a concave-conical packed surface upon scattering of particles in such a way that the maximum scatter distance of the particles on the packed surface is an inner wall surface of the vessel and having a parameter with which to control the size of a resulting cone and a packing monitor capable of continuously detecting the packed surface condition, comprising the steps of:

(a) forming a concave-conical packed surface of the particles scattered in a steady state by the distributor while the packing monitor is continuously detecting the formation of the packed surface, and (b) at least intermittently controlling the parameter of the particle distributor to reduce the cone size gradually to form and deposit, on an inner side of the concave-conical packed surface, successively smaller concave-conical packed surfaces at least at predetermined intervals, whereby a flat, smooth packed surface is formed.

3. A method of packing particles in a vessel using a particle packing apparatus which includes a particle distributor capable of forming a concave-conical packed surface upon scattering of particles in a steady state and having a parameter with which to control the size of a resulting cone and a packing monitor capable of continuously detecting the packed surface condition, comprising the steps of:

(a) forming a concave-conical packed surface of the particles scattered in a steady state by the distributor while the packing monitor is continuously detecting the formation of the packed surface, (b) at least intermittently controlling the parameter of the particle distributor to reduce the cone size gradually to form and deposit, on the inner side of the concave-conical packed surface, successively smaller concave-conical packed surfaces at least at predetermined intervals, wherein the concave-conical packed surface has a center and an edge, and (c) when the concave-conical packed surface formed by scattering the particles in a steady state for a given time period has a height at the center (h(ct)) and a height at the edge (h(edge)), controlling the profile of the concave-conical packed surface to be formed by scattering the particles by controlling the parameter of the particle packing apparatus such that $2 \geq h(edge)/h(ct) \geq 1$ whereby a flat, smooth packed surface is formed.

4. A method of packing particles in a vessel using a particle packing apparatus which includes a particle distributor capable of forming a concave-conical packed surface upon scattering of particles in a steady state and having a parameter with which to control the size of a resulting cone and a packing monitor capable of continuously detecting the packed surface condition, comprising the steps of:

(a) forming a concave-conical packed surface of the particles scattered in a steady state by the distributor while the packing monitor is continuously detecting the formation of the packed surface, (b) at least intermittently controlling the parameter of the particle distributor to reduce the cone size gradually to form and deposit, on the inner side of the concave-conical packed surface, successively smaller concave-conical packed surfaces at least at predetermined intervals, wherein the concave-conical packed surface has a center and an edge, and (c) when the concave-conical packed surface formed by scattering the particles in a steady state for a given time period has a height at the center (h(ct)) and the height at the edge (h(edge)), the profile of the concave-conical packed surface to be formed by controlling the parameter of the particle packing apparatus such that $2 > h(edge)/h(ct) > 1$, whereby a flat, smooth packed surface is formed.

5. The method of packing particles in a vessel of the claim 1 wherein the operation for forming the smooth packed surface is repeated.

6. The method of claim 1 wherein the particle distributor is of a type having side slits equipped with adjustable gates, one for each, and a lower slit at the bottom, and a rotating disc attached to the bottom, the openings of the side and lower slits and the number of revolution of the rotating disc being adjustable to control the scatter condition.

7. The method of claim 1 wherein the particle distributor comprises an outside cover, a hopper located inside and supported by the cover, with the lower end open, a motor mounted on the hopper and coupled to a rotating shaft extending downwardly through the center of the hopper and beyond the lower opening thereof, and a uniaxial spheroidal rotating disc fixed to the lower end of the motor rotating shaft so as to receive the particles falling from the hopper, said rotating disc having slits formed to discharge particles therefrom, each said slit being so shaped that the path of particles therethrough is a locus represented by the sum of a locus of a particle that has fallen from the hopper onto the center of the uniaxial spheroidal disc moves until its movement reaches the speed of the disc under the action of the rotational force and the function of the locus in which the angle of retardation in the rotating direction with respect to the distance of radial movement from the center of the disc agrees with be required quantity of particles to the scattered in the radial position.

8. A method of packing particles in a vessel using a particle packing apparatus, comprising the steps of:

(a) providing a particle distributor capable of forming a concave-conical packed surface upon scattering of particles in a steady state and having a parameter with which to control the size of a resulting cone, the particle distributor including an outside cover, a hopper located inside and supported by the cover, with the lower end open, a motor mounted on the hopper and coupled to a rotating shaft extending downwardly through a center of the hopper and beyond the lower opening thereof, and a uniaxial spheroidal rotating disc fixed to a lower end of the motor rotating shaft so as to receive the particles falling from the hopper, said rotating disc having slits formed to discharge particles therefrom, each said slit being shaped so that a path of particles therethrough is a locus represented by a sum of a locus of a particle that has fallen from the hopper onto a center of the uniaxial spheroidal disc which moves until its movement reaches the speed of the disc under action of the rotational force and a function of a locus in which an angle of retardation in a rotating direction with respect to a distance of radial movement from the center of the disc agrees with a required quantity of particles to be scattered in the radial position, and a packing monitor capable of continuously detecting a profile of the packed surface, (b) forming a concave-conical packed surface of the particles scattered in a steady state by the distributor while the packing monitor is continuously detecting the formation of the packed surface, (c) at least intermittently controlling the parameter of the particle distributor to reduce the cone size gradually to form and deposit, on an inner side of the concave-conical packed surface, successively smaller concave-conical packed surfaces at least at predetermined intervals, whereby a flat, smooth packed surface is formed, wherein the locus of the particle that has fallen from the hopper onto the center of the uniaxial spheroidal disc which moves until its movement reaches the speed of the disc under the action of the rotational force is expressed by:

$$\omega = 2\pi m/60$$

$$\theta = x (0 \leq x \leq B)$$

$$r = a\sqrt{1 - \frac{g^2 c^2}{\left(\frac{\omega x}{B}\right)^4 a^4}}$$

where r: radial position
a: major axis of the rotating disc
c: minor axis of the rotating disc
g: gravity acceleration
θ: position in the rotating direction
ω: angular velocity
m: steady number of revolution of the rotating disc (rpm)
B: angle over which the particle has moved to attain the same velocity as the rotating disc.

9. A method of packing particles in a vessel using a particle packing apparatus, comprising the steps of:

(a) providing a particle distributor capable of forming a concave-conical packed surface upon scattering of particles in a steady state and having a parameter with which to control the size of a resulting cone, the particle distributor including an outside cover, a hopper located inside and supported by the cover, with the lower end open, a motor mounted on the hopper and coupled to a rotating shaft extending downwardly through a center of the hopper and beyond the lower opening thereof, and a uniaxial spheroidal rotating disc fixed to a lower end of the motor rotating shaft so as to receive the particles falling from the hopper, said rotating disc having slits formed to discharge particles therefrom, each said slit being shaped so that a path of particles therethrough is a locus represented by a sum of a locus of a particle that has fallen from the hopper onto a center of the uniaxial spheroidal disc which moves until its movement reaches the speed of the disc under action of the rotational force and a function of a locus in which an angle of retardation in a rotating direction with respect to a distance of radial movement from the center of the disc agrees with a required quantity of particles to be scattered in the radial position, and a packing monitor capable of continuously detecting a profile of the packed surface;

(b) forming a concave-conical packed surface of the particles scattered in a steady state by the distributor while the packing monitor is continuously detecting the formation of the packed surface, (c) at least intermittently controlling the parameter of the particle distributor to reduce the cone size gradually to form and deposit, on an inner side of the concave-conical packed surface, successively smaller concave-conical packed surfaces at least at predetermined intervals, whereby a flat, smooth packed surface is formed, wherein the locus in which the angle of retardation in the rotating direction with respect to the distance of radial movement from the center of the disc agrees with the required quantity of particles to be scattered in the radial position is expressed by:

$$r_i = \frac{a \cdot i}{n} \quad (i = 0, 1, \ldots n)$$

$$\theta_i = \sum_{j=0}^{n} A \left(\frac{r_j}{a}\right)^2$$

where

A: maximum phase angle of slit (deg.) (A=360/no. of slits)
$r_i$: radial position
$\theta_i$: position in the rotational direction
a: major axis of the rotating disc;
n: number of division of slit.

10. A method of packing particles in a vessel using a particle packing apparatus, comprising the steps of:

(a) providing a particle distributor capable of forming a concave-conical packed surface upon scattering of particles in a steady state and having a parameter with which to control the size of a resulting cone, the particle distributor including an outside cover, a hopper located inside and supported by the cover, with the lower end open, a motor mounted on the hopper and coupled to a rotating shaft extending downwardly through a center of the hopper and beyond a lower opening thereof, and a uniaxial spheroidal rotating disc fixed to the lower end of the motor rotating shaft so as to receive the particles falling from the hopper, said rotating disc having slits formed to discharge particles therefrom, each said slit being shaped so that a path of particles therethrough is a locus represented by a sum of a locus of a particle that has fallen from the hopper onto a center of the uniaxial spheroidal disc which moves until its movement reaches the speed of the disc under action of the rotational force and a function of a locus in which the angle of retardation in a rotating direction with respect to a distance of radial movement from the center of the disc agrees with a required quantity of particles to be scattered in the radial position, and a packing monitor capable of continuously detecting a profile of the packed surface;

(b) forming a concave-conical packed surface of the particles scattered in a steady state by the distributor while the packing monitor is continuously detecting the formation of the packed surface, (c) at least intermittently controlling the parameter of the particle distributor to reduce the cone size gradually to form and deposit, on an inner side of the concave-conical packed surface, successively smaller concave-conical packed surfaces at least at predetermined intervals, whereby a flat, smooth packed surface is formed, wherein the locus in which the angle of retardation in the rotating direction with respect to the distance of radial movement from the center of the disc agrees with the required quantity of particles to be scattered in the radial position is expressed by:

$$r_i = \frac{a \cdot i}{n} \quad (i = 0, 1, \ldots n)$$

$$\theta_i = \sum_{j=0}^{n} A \left\{ \left(\frac{r_j}{a}\right)^2 - \left(\frac{r_{j-1}}{a}\right)^2 \right\}$$

where

A: maximum phase angle of slit (deg.) (A=360/no. of slits)

$r_i$: radial position $\theta_i$: position in the rotational direction a: major axis of the rotating disc;

n: number of division of slit.

11. The method of claim 1 wherein the packing monitor is of a type comprising a laser-scanner for producing a laser beam having a beam diameter greater than the cross sectional area of the particles and chosen depending on the target accuracy to scan the deposited particle surface, an imaging device for detecting laser reflection light from scanned points, said laser-scanner and imaging device being both attached to the inner wall of the vessel at levels above the packed height therein, a computer for calculating the depth of packed surface at specific scanned points by trigonometry from the locations of the scanning points at the time of measurement, the position of the laser-scanner, and the position of the imaging device, and a display device that displays the data including the packed surface distribution.

12. The method of claim 1 wherein the packing monitor is of a type comprising a laser-scanner for producing a laser beam having a beam diameter greater than the cross sectional area of the particles and chosen depending on the target accuracy to scan the deposited particle surface, an imaging device for detecting reflected laser light from scanned points, said laser-scanner and imaging device being both attached to the inner wall of the vessel at levels above the packed height therein, a computer for calculating the depth of packed surface at the specific scanned points by trigonometry from the locations of the scanned points at the time of measurement, the position of the laser generator-scanner, and the position of the imaging device, and a display device that displays the data including the packed surface distribution, the method further comprising, in packing particles in a vessel, scanning the deposit surface with the laser light, detecting the reflected light, measuring the deposit height by trigonometry from locations of the specific scanned points, the laser light emitting position, and the reflected laser light detecting point, dividing the deposit surface into matrices of m×n, sequentially irradiating the points on each matrix with laser, and performing image processing whereby several frames of images taken at each point are integrated to choose an image closest to a laser spot registered beforehand, and the center of gravity of each said image is found and made a laser spot, said image processing being made only within a range of at least one half of the maximum value of unevenness in the depth direction of the deposit surface from the points expected to meet the laser spot.

13. The method of claim 1 wherein the particles are catalyst particles.

14. A particle distributor comprising an outside cover, a hopper located inside and supported by the cover, with the lower end open, a motor mounted on the hopper and coupled to a rotating shaft extending downwardly through a center of the hopper and beyond a lower opening thereof, and a uniaxial spheroidal rotating disc fixed to a lower end of the motor rotating shaft so as to receive particles falling from the hopper, said rotating disc having slits formed to discharge the particles therefrom, each said slit is shaped so that a path of particles therethrough is a locus represented by a sum of a locus of a particle that has fallen from the hopper onto a center of the uniaxial spheroidal disc which moves until its movement reaches the speed of the disc under action of rotational force, and a function of a locus in which an angle of retardation in a rotating direction with respect to a distance of radial movement from the center of the disc agrees with a required quantity of particles to be scattered in the radial position, wherein the locus of the particle that has fallen from the hopper onto the center of the uniaxial spheroidal disc which moves until its movement reaches the speed of the disc under the action of the rotational force is expressed by:

$$\omega = 2\pi m/60$$

$$\theta = x (0 \leq x \leq B)$$

$$r = a\sqrt{1 - \frac{g^2 c^2}{\left(\frac{\omega x}{B}\right)^4 a^4}}$$

where r: radial position a: major axis of the rotating disc c: minor axis of the rotating disc g: gravity acceleration $\theta$: position in the rotating direction $\omega$: angular velocity m: steady number of revolution of the rotating disc (rpm)

angle over which the particle has moved to attain the same velocity as the rotating disc.

15. A particle distributor comprising an outside cover, a hopper located inside and supported by the cover, with the lower end open, a motor mounted on the hopper and coupled to a rotating shaft extending downwardly through a center of the hopper and beyond a lower opening thereof, and a uniaxial spheroidal rotating disc fixed to the lower end of the motor rotating shaft so as to receive particles falling from the hopper, said rotating disc having slits formed to discharge the particles therefrom, each said slit is shaped so that a path of particles therethrough is a locus represented by a sum of a locus of a particle that has fallen from the hopper onto a center of the uniaxial spheroidal disc which moves until its movement reaches a speed of the disc under action of rotational force, and a function of a locus in which an angle of retardation in a rotating direction with respect to a distance of radial movement from the center of the disc agrees with a required quantity of particles to be scattered in the radial position, wherein the locus in which the angle of retardation in the rotating direction with respect to the distance of radial movement from the center of the disc agrees with the required quantity of particles to be scattered in the radial position is expressed by:

$$r_i = \frac{a \cdot i}{n} \quad (i = 0, 1, \ldots n)$$

$$\theta_i = \sum_{j=0}^{n} A\left(\frac{r_j}{a}\right)^2$$

where

A: maximum phase angle of slit (deg.) (A=360/no. of slits)

$r_i$: radial position $\theta_i$: position in the rotational direction a: major axis of the rotating disc;

n: number of division of slit.

16. A particle distributor comprising an outside cover, a hopper located inside and supported by the cover, with the lower end open, a motor mounted on the hopper and coupled to a rotating shaft extending downwardly through a center of the hopper and beyond a lower opening thereof, and a uniaxial spheroidal rotating disc fixed to the lower end of the motor rotating shaft so as to receive particles falling from the hopper, said rotating disc having slits formed to discharge the particles therefrom, each said slit is shaped so that a path of particles therethrough is a locus represented by a sum of a locus of a particle that has fallen from the hopper onto a center of the uniaxial spheroidal disc which moves until its movement reaches a speed of the disc under action of rotational force, and a function of a locus in which an angle of retardation in a rotating direction with respect to a distance of radial movement from the center of the disc agrees with a required quantity of particles to be scattered in the radial position, wherein the locus in which the angle of retardation in the rotating direction with respect to the distance of radial movement from the center of the disc agrees with the required quantity of particles to be scattered in the radial position is expressed by:

$$r_i = \frac{a \cdot i}{n} \ (i = 0, 1, \ldots n)$$

$$\theta_i = \sum_{j=0}^{n} A \left\{ \left(\frac{r_j}{a}\right)^2 - \left(\frac{r_j - 1}{a}\right)^2 \right\}$$

where

A: maximum phase angle of slit (deg.) (A=360/no. of slits)

$r_i$: radial position $\theta_i$: position in the rotational direction a: major axis of the rotating disc;

n: number of division of slit.

* * * * *